(12) United States Patent
Teter et al.

(10) Patent No.: US 6,710,032 B1
(45) Date of Patent: Mar. 23, 2004

(54) IN SITU FORMATION OF CLA

(75) Inventors: Beverly B. Teter, College Park, MD (US); Joseph Sampugna, University Park, MD (US); Richard A. Erdman, Columbia, MD (US); Lilianna Piperova, Greenbelt, MD (US)

(73) Assignee: University of Maryland, College Park, MD (US)

( * ) Notice: Subject to any disclaimer, the term of this patent is extended or adjusted under 35 U.S.C. 154(b) by 329 days.

(21) Appl. No.: 09/709,517

(22) Filed: Nov. 13, 2000

Related U.S. Application Data

(63) Continuation-in-part of application No. PCT/US99/10726, filed on May 12, 1999.
(60) Provisional application No. 60/085,199, filed on May 12, 1998.

(51) Int. Cl.[7] .................... A61K 31/70; A61K 31/20
(52) U.S. Cl. .................... 514/23; 514/558; 514/560
(58) Field of Search ..................... 514/23, 558, 560

(56) References Cited

U.S. PATENT DOCUMENTS

| | | | |
|---|---|---|---|
| 5,503,112 A | * | 4/1996 | Luhman et al. ............. 119/174 |
| 5,600,852 A | | 2/1997 | Densch |
| 5,676,966 A | | 10/1997 | Kitamura et al. |

* cited by examiner

*Primary Examiner*—Zohreh Fay
(74) *Attorney, Agent, or Firm*—Millen, White, Zelano & Branigan, P.C.

(57) ABSTRACT

This is invention relates to increasing levels of 18:1 trans fatty acids in production animals, the products of which may then be fed to mammals which in turn leads to the production of CLA form ingested 18:1 trans fatty acids; a method to screen diets using a mouse model to detect the effect on milk fat production and content; and a method and device for milking a mouse.

18 Claims, 3 Drawing Sheets

IN SITU FORMATION OF CLA

This is a continuation-in-part of International Application PCT/US99/10726 filed May 12, 1999 which claims priority to provisional application 60/085,199 filed May 12, 1998.

FIELD OF THE INVENTION

This invention relates to increasing levels of 18:1 trans fatty acids in production animals, the products of which may then be fed to mammals which in turn leads to the production of CLA from ingested 18:1 trans fatty acids; a method to screen diets using a mouse model to detect the effects on milk fat production and content; and a method and device for milking a mouse.

BACKGROUND OF THE INVENTION

Conjugated linoleic acid (CLA) is a mixture of positional and geometric isomers of linoleic acid—acids having lengths of 18 carbons with 2 conjugated double bonds. It is understood that conjugated linoleic acid is beneficial in suppressing the growth of breast cancer cells and tumeroigenesis (Wong), (Visonnes), (Cunningham), and in partitioning whole body energy (Pariza). It is also generally accepted that the cis-9, trans-11 isomer of linoleic acid is the most effective metabolically.

It is known that CLA results from the microbial biohydrogenation of polyunsaturated fatty acids (PUFA). It is also known that dairy products have been identified as the richest source of CLA's in the American diet. It is not known whether all the CLA appearing in milk or muscle tissue of ruminants is derived from the ruminal supply or is produced by the liver or the mammary gland from the 18:1 trans fatty acid (tFA) produced in the rumen and excreted in the milk or found in the muscle. However, it is known that the trans geometry of the bond is not formed in the mammalian system but must be of dietary origin—either by ruminal biohydrogenation or supplemented from partially hydrogenated oils.

As suggested above, trans isomers are not produced by the mammalian (including human) body. Thus, the current emphasis is to feed CLA's to animals or humans.

Unfortunately, a diet supplement of free fatty acids or other compounds or triglycerides containing CLA, for instance a supplement of cis-9, trans-11 CLA is not always beneficial. Supplements currently available are mixtures known to be antimicrobial and, thus, their ingestion may be deleterious to digestive microbia. Studies have also shown that the eggs of laying birds failed to hatch and that tumor loads in mice decreased when such subjects were directly fed CLA. Thus, there is an indication that CLA's inhibit meiosis. In situ production of CLA's would prevent some of the reported side effects of CLA. In addition the in situ reaction could be directed to produce only those CLA Isomers deemed beneficial and provide consumers with the reported benefits of CLA consumption (i.e. cis-9, trans-11 CLA or others). Furthermore, the acid conditions in the human stomach may lead to isomerization of the cis-9, trans-11 CLA isomer when ingested but if precursors are fed and desaturated in situ only desired CLA's would be produced in the tissues.

In addition, the current attempts to provide CLA's of animal origin are difficult to control. Biohydrogenation may not stop at the CLA step and thus provide variable levels in food. The optimal dosages for maximum benefit are not known and high levels of consumption may have adverse as well as beneficial effects. Recent efforts to feed humans partially hydrogenated vegetable oils in order to increase serum CLA's has the disadvantage of producing isomers other than cis-9, trans-11 as well as the documented adverse effects of trans 18:1 monomers and possibly other 18:1 isomers. Feeding trans-11 18:1 enriched diets would obviate deleterious effects of other isomers.

SUMMARY OF THE INVENTION

The inventors increase levels of the trans fatty acids in production animals, the products of which are then consumed by humans. In order to derive CLA benefits it is necessary for mammals to ingest fatty acid trans isomers such as the 18:1t-11 isomer. This isomer is the major isomer in dairy fat and one of the major isomers present in partially hydrogenated vegetable oils, but process dependent. The 18:1t-11 isomer is desaturated in any mammalian body by a common enzyme, delta-9 desaturase, at the n-9 position yielding cis-9, trans-11-CLA.
—the CLA isomer reported to be most beneficial. Likewise, certain trans 18:1 and cis 18:1 fatty acids can be desaturated by the animal liver or mammary gland at the delta-9 position. The trans 11-18:1 is one of the isomers capable of being desaturated in this manner. Providing the appropriate substrate, (i.e. trans-11-18:1, trans vaccinic acid) would allow the mammary gland to produce cis-9, trans-11-18:2 by action of the delta-9 desaturase which is active in the gland during lactation. Likewise, in beef cattle as well as dairy cows, the liver as well as other tissues are able to produce CLA's from trans-monoene substrates.

Thus, an object of the invention is to allow for an animal or person to produce their own CLA's in situ; such a process is under metabolic controls and at the levels that are appropriate for the individual organism.

Another object of this invention is to alter rumen conditions to lead to variations, i.e., increases in the amounts of tFA (trans 18:1) and trans-18:2 fatty acids including CLA's produced by the production animal.

Another object of the invention is to design diets which provide the appropriate oil substrates and rumen environment to optimize the production of tFA.

Another object of the invention is to provide a method for increasing the production of cis, trans conjugated acids in a mammal comprising, feeding to a mammal the food products of production animals fed diets high in carbohydrates or diets with protected tFA, or said food products containing increased levels of 18:1 trans-11 acid as a result of consuming diets high in carbohydrates and fat.

Another object is to provide a feed supplement or feed composition that prevents lactation failure in mammals.

Another object is to provide a small animal model wherein a specific diet produced is fed to the small animal and meat and milk products are analyzed to predict milk and meat composition of larger production animals.

DETAILED DESCRIPTION OF THE INVENTION

Definitions

As used herein a production animal is defined as an animal such as beef and dairy cows, swine, lamb, chicken, duck, goose, emu, ostrich and fish.

FCM—fat corrected milk cFA—cis fatty acid whether containing a single double bond or multiple double bond, conjugated or unconjugated.

MFD—milk fat depression.

GRAS—Generally recognized as safe

DIM—days in milk

DMI—dry matter intake

DM—dry matter

FAME—fatty acid methyl ester tFA—fatty acid whether containing a single double bond or multiple double bonds, conjugated or unconjugated.

CLA—a mixture of positional and geometric isomers of linoleic acid—acids having carbon lengths of 18 with two double bonds which are conjugated.

CLnA—a mixture of positional and geometric isomers of linolenic acids having carbon lengths of 18 with three double bonds which are conjugated.

PHVS—partially hydrogenated vegetable shortening

PHVO—partially hydrogenated vegetable oil

PUFA—polyunsaturated fatty acids

HOSO—high oleic sunflower oil

HLSO—high linoleic sunflower oil

FA—fatty acid

VFA—volatile fatty acid

Figure 1:
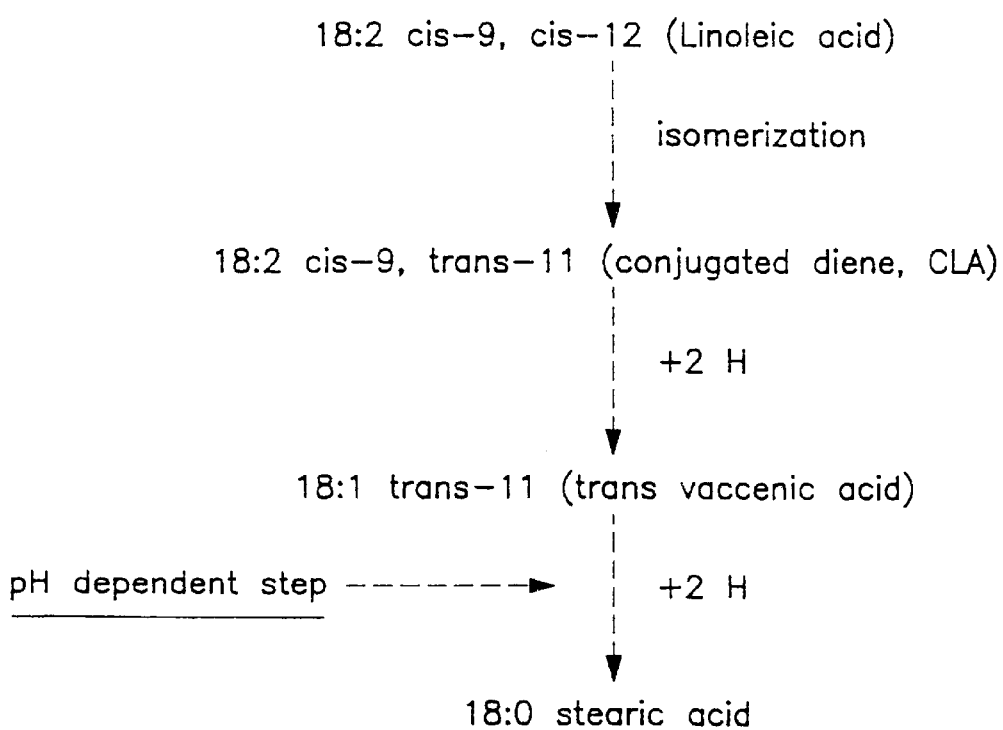
FIG. 1 shows ruminal biohydrogenation of linoleic acid (18:2 n-6).

In the rumen the production of tFA is a several step process which depends on the fat and fatty acid substrates present in the rumen. Ruminants fed high amounts of linoleic acid i.e., diets high in corn oil, will biohydrogenate such acid as shown in FIG. 1. The last step in the process is pH dependent. Thus, allowing for the accumulation of 18:1 trans 11 (trans vaccenic acid) by providing linoleic acid containing feeds as a substrate and/or lowering the pH of the rumen prior to the conversion of trans vaccinic acid to stearic acid, allows for the accumulation of the substrate for production of CLA's found in the food products of production animals. The 18:1 trans-11 isomer is GRAS since it has been present in dairy products for years.

Figure 2:
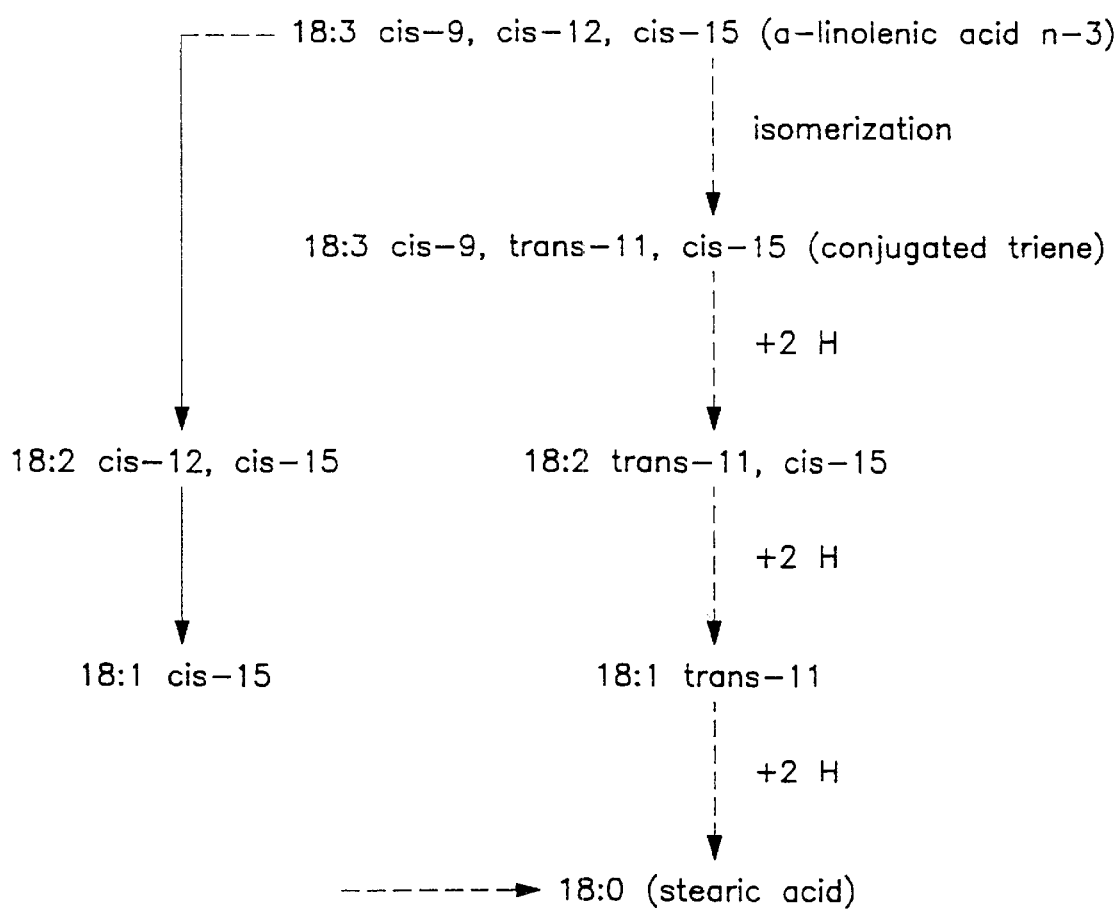
FIG. 2 shows ruminal biohydrogenation of linolenic acid (18:3 n-3).

Ruminants fed high amounts of linolenic acid, i.e., diets high in oils such as soy oil, will biohydrogenate such acid as shown in FIG. 2. Again, the last step in the process is pH dependent. Thus, allowing for the accumulation of 18:1 trans-11 (trans vaccenic acid) by providing linolenic acid containing feeds as a substrate and/or lowering the pH of the rumen prior to the conversion of trans vaccinic acid to stearic acid allows for the accumulation of the substrate for production of CLA's and CLA's themselves found in the food products (milk, cheese and meat) of production animals.

Thus, decreased pH leads to more tFA formation. Increased levels of polyunsaturated fatty acids (PUFA) 18:2 and 18:3 leads to more tFA production. A feed of all forage produces mostly 18:1 trans-11 or n-7 in the rumen (Katz and Keeney). Appropriate rumen conditions and feed can alter the level tFA formed and the isomer distribution. By controlling rumen conditions it is possible to direct the levels and isomer distribution of tFA produced.

In the case of non-ruminants, if the diet of the animal contains the substrate (i.e. trans-11-18:1) it would be absorbed in the digestive tract and provide the substrate to the tissues for CLA production.

EXAMPLE 1

The object of this example is to show the effects of dietary fat source on duodenal flow, apparent absorption, and milk fat incorporation of trans 18:1 fatty acids. (See Kalscheur et. al, "Effect of Fat Source on Duodenal Flow of Trans-$C_{18:1}$ Fatty Acids and Milk Fat Production in Dairy Cows" J. Dairy Science 80:2115–2126 (1997) herein incorporated by reference)

MATERIALS AND METHODS

Cows, Experimental Design, and Treatments

Four multiparous Holstein cows averaging 213 DIM at the beginning of the experiment were fitted with ruminal and duodenal (T-type gutter channel) cannulas. Duodenal cannulas were inserted proximal to the common bile and pancreatic duct, approximately 10 cm distal to the pylorus. Treatments, applied in a 4×4 Latin square design, consisted of either 0% supplemental fat the control diet 3.7% supplemental HOSO (Trisun 100A high oleic sunflower oil; SVO Enterprises, Eastlake, Ohio), 3.7% supplemental HLSO (Food grade sunflower oil; Columbus Foods Co., Chicago, Ill.), or 3.7% supplemental PHVS (Heavy duty vegetable frying shortening; Bunge Foods, Bradley, Ill.). Supplemental fat was substituted for corn in the basal diet. The FA compositions of the fat supplements are presented in Table 1.

TABLE 1

Long-chain fatty acid (FA) composition of high oleic sunflower oil (HOSO), high linoleic sunflower oil (HLSO), and partially hydrogenated vegetable shortening (PHVS).

| | (g/100 g of fat) | | |
|---|---|---|---|
| FA | HOSO[1] | HLSO[2] | PHVS[3] |
| $C_{14:0}$ | ND[4] | ND | 0.08 |
| $C_{16:0}$ | 4.15 | 6.58 | 10.14 |
| $C_{16:1}$ | 0.05 | 0.02 | ND |
| $C_{17:0}$ | 0.01 | 0.01 | 0.11 |
| $C_{18:0}$ | 4.13 | 4.61 | 12.57 |
| trans-$C_{18:1}$ | ND | 0.59 | 43.23 |
| cis-$C_{18:1}$ | 77.91 | 20.16 | 28.83 |
| $C_{18:2}$ | 11.09 | 65.18 | 0.63 |
| $C_{18:3}$ | 0.02 | 1.25 | 0.21 |
| $C_{\geq 20:n}$[5] | 2.62 | 1.60 | 3.70 |

[1]Trisun 100 A high oleic sunflower oil (SVO Enterprises, Eastlake, OH).
[2]Food grade sunflower oil (Columbus Foods Co., Chicago, IL).
[3]Heavy duty vegetable frying shortening (Burge Foods, Bradley, IL).
[4]Not detected.
[5]Includes saturated and unsaturated FA.

The diets were formulated to meet NRC (16) guidelines for milk production at 40 kg/day with 3.8% fat. Ingredient and nutrient compositions of the diets are shown in Table 2. The forage portion of each diet consisted of 60% corn silage and 40% alfalfa haylage. The DM percentage of forage and concentrate was determined weekly and the total mixed diets were adjusted accordingly to maintain a constant forage to concentrate ratio on a DM basis. The FA composition of the dietary ingredients and the calculated FA composition of the total mixed diets are presented in Table 3.

TABLE 2

Ingredients and chemical compositions of total mixed diets for cows fed the control diets supplemented with high oleic sunflower oil (HOSO), high linoleic sunflower oil (HLSO), or partially hydrogenated vegetable shortening (PHVS).

| Composition | Diet | | | |
|---|---|---|---|---|
| | Control | HOSO | HLSO | PHVS |
| | (% of DM) | | | |
| Ingredient | | | | |
| Corn silage | 36.0 | 36.0 | 36.0 | 36.0 |
| Alfalfa haylage | 24.0 | 24.0 | 24.0 | 24.0 |
| Ground corn | 20.5 | 17.0 | 17.0 | 17.0 |
| Soyplus ®[1] | 17.0 | 16.9 | 16.9 | 16.9 |
| Dicalcium phosphate | 0.9 | 0.9 | 0.9 | 0.9 |
| Limestone | 0.5 | 0.5 | 0.5 | 0.5 |
| NaCl | 0.4 | 0.4 | 0.4 | 0.4 |
| Dynamate ®[2] | 0.4 | 0.4 | 0.4 | 0.4 |
| Trace mineral and vitamin mix[3] | 0.2 | 0.2 | 0.2 | 0.2 |
| Oleic sunflower oil | — | 3.7 | — | — |
| Linoleic sunflower oil | — | — | 3.7 | — |
| Vegetable shortening | — | — | — | 3.7 |
| Chemical | | | | |
| DM, % | 46.3 | 46.5 | 46.5 | 46.5 |
| OM | 92.2 | 92.1 | 92.2 | 92.1 |
| CP | 20.2 | 19.8 | 19.8 | 20.1 |
| NDF | 35.4 | 34.9 | 35.0 | 34.6 |
| ADF | 19.6 | 19.4 | 22.3 | 19.2 |
| Ca | 0.94 | 0.98 | 0.96 | 0.96 |
| P | 0.57 | 0.56 | 0.54 | 0.56 |
| Mg | 0.25 | 0.24 | 0.24 | 0.24 |
| K | 2.01 | 2.01 | 1.99 | 2.02 |
| Na | 0.20 | 0.18 | 0.18 | 0.19 |
| $NE_1$[4], Mcal/kg of DM | 1.66 | 1.80 | 1.80 | 1.80 |

[1]Soyplus/West Central (Ralston, IA).
[2]Pitman-Moore, Inc. (Chicago, IL); guaranteed analysis: 22% S, 18% K, and 11% Mg.
[3]Formulated to provide (per kilogram of dietary DM) 3000 IU of vitamin A, 500 IU of vitamin D, 10 IU of vitamin E, 50 mg of Fe, 40 mg of Zn, 40 Mg of Mn, 10 mg of Cu, 0.6 mg of I, and 0.3 mg of Se.
[4]Calculated from NRC (16).

TABLE 3

Fatty acid (FA) composition of concentrates, forages, and total mixed diets for cows fed the control diet or diets supplemented with high oleic sunflower oil (HOSO), high linoleic sunflower oil (HLSO), or partially hydrogenated vegetable shortening (PHVS).

| FA | Concentrate mix | | | | Corn silage | Alfalfa haylage | Diet | | | |
|---|---|---|---|---|---|---|---|---|---|---|
| | Control | HOSO | HLSO | PHVS | | | Control | HOSO | HLSO | PHVS |
| | (% of DM) | | | | | | | | | |
| $C_{16:0}$ | 0.636 | 1.024 | 1.245 | 1.388 | 0.489 | 0.513 | 0.552 | 0.705 | 0.791 | 0.847 |
| $C_{16:1}$ | 0.002 | 0.002 | 0.003 | 0.002 | 0.009 | 0.045 | 0.015 | 0.015 | 0.015 | 0.015 |
| $C_{18:0}$ | 0.151 | 0.519 | 0.573 | 1.120 | 0.075 | 0.095 | 0.110 | 0.254 | 0.275 | 0.490 |
| trans-$C_{18:1}$ | ND[1] | 0.008 | 0.054 | 2.461 | 0.029 | ND | 0.014 | 0.014 | 0.031 | 0.975 |
| cis-$C_{18:1}$ | 1.082 | 6.763 | 2.928 | 3.586 | 0.568 | 0.074 | 0.650 | 2.879 | 1.376 | 1.633 |
| $C_{18:2}$ | 2.676 | 3.502 | 7.015 | 3.172 | 1.589 | 0.418 | 1.734 | 2.061 | 3.441 | 1.933 |
| $C_{18:3}$ | 0.277 | 0.308 | 0.353 | 0.329 | 0.157 | 0.832 | 0.365 | 0.377 | 0.395 | 0.385 |
| Other[2] | 0.043 | 0.278 | 0.197 | 0.208 | 0.086 | 0.264 | 0.128 | 0.276 | 0.242 | 0.247 |
| Total | 4.867 | 12.406 | 12.368 | 12.266 | 3.002 | 2.241 | 3.565 | 6.581 | 6.566 | 6.525 |

[1]Not detected
[2]Includes $C_{14:0}$, $C_{17:0}$, and $C_{\geq 20:0}$.

Experimental Procedure

Each experimental period consisted of 3 wk of which the first 16 d were used as an adjustment period. Cows were housed in individual tie stalls and were fed for ad libitum intake (allowing for 5 to 10% orts) once daily at 0800 h. Fats were blended into the concentrate every 10 or 11 d with a tumble mixer (Steiner Roll-A-Mix; Steiner Corp., Orrville, Ohio). At each feeding, dietary ingredients were thoroughly mixed. Feed intakes and orts were recorded daily. Samples of corn silage, alfalfa haylage, and concentrates fed to each cow and orts from each cow were collected on d 17 to 20 of each period, composted, oven-dried at 65° C., and ground through a Wiley mill (1-mm screen; Arthur H. Thomas, Philadelphia, Pa.) for later analysis. Milk production was recorded at each milking (0100 and 1230 h). Morning and evening milkings were sampled during the last 3 d (six consecutive milkings) of each period. Cows were exercised each morning from 0600 to 0800 h. Body weight was recorded weekly at 1100 h every Tuesday.

From d 11 to 21 of each period, $Cr_2O_3$ was mixed with the concentrate portion of the diet at a rate of approximately 20 g/d per cow based on previous DM intake to measure duodenal nutrient flow and to calculate total tract digestibility. Actual $Cr_2O_3$ intakes were determined by chemical analysis of the feeds and orts. Duodenal and fecal samples (250 ml) were collected every 2 h over a 24-h period. Duodenal samples were collected after discarding the first surge of digesta to help reduce bile contamination. Duodenal samples were frozen at −20° C., thawed, composited, and freeze-dried before being ground through a 1-mm screen.

Ruminal fluid samples for VFA and pH were collected every 2 h over a 12-h duration on d 21 of each experimental period beginning just before the morning feeding. Samples were collected in five distinct locations (10 ml of ruminal fluid per location) using a stainless steel sampling probe. Ruminal fluid pH was determined by glass electrode, acidified to pH<2 with 1 ml of 50% (vol/vol) $H_2SO_4$, and frozen for VFA analysis.

Ruminal samples for isolating bacteria were obtained on d 211 of each period at 0, 4, 8, and 12 h after the morning feeding. Whole ruminal contents, acquired from the anterior, dorsal, and midventral regions of the rumen, were squeezed through four layers of cheesecloth. Five hundred milliliters of the strained ruminal fluid were collected at each sampling, combined with 125 ml of a 0.9% NaCl and 37% formaldehyde solution to preserve ruminal bacteria, and refrigerated at 5° C. until centrifugation to isolate bacteria. Remaining ruminal contents were returned to the cow. Composited samples were centrifuged at 500 (g for 15 min at 4° C. to remove feed particles and protozoa. The supernatant was centrifuged at 20,000 (g for 20 min at 4° C., washed with 0.9% NaCl, recentrifuged, and rinsed with distilled water to isolate the bacteria from the suspension. The remaining pellet was frozen, freeze-dried, and ground through a 1-mm screen for later analysis.

Analytical Procedures

Composited samples of alfalfa haylage, corn silage, concentrates, orts, duodenal digesta, and feces were analyzed for DM (100° C. for 24 h), OM (1), and N by the micro-Kjeldahl procedure (1). Feed samples were additionally analyzed for NDF (25), ADF (10), Ca, P, Mg, K, and Na (Northeast DHIA Forage Analysis Laboratory, Ithaca, N.Y.). Long-chain FA compositions of feed, fecal, duodenal and milk samples were quantified by GLC as described by Gaynor et al. (9), except that feed, fecal, and duodenal methyl esters were purified through a silicic acid column (Bio-sil A 100–200 mesh; Bio-Rad Laboratories, Hercules, Calif.) to remove contaminants prior to GLC analysis. Individual milk samples were analyzed for fiat, protein, and lactose by Environmental Systems Services (College Park, Md.) using infrared analysis (Foss Milkoscan 104AB; Foss Food Technology Corp., Eden Prairie, Minn.). Ruminal VFA concentrations were determined by gas chromatography (Sigma 300; Perkin-Elmer Corp., Norwalk, Conn.) using ethyl butyrate as an internal standard in a 2-m glass column packed with GP 15% SP-1220/1% $H_3PO_4$ on 100/120 Chromosorb® (Supelco Inc., Bellefonte, Pa.). Helium was the carrier gas and the injector, column, and detector temperatures were 200, 140, and 220° C., respectively.

Concentrates, orts, duodenal digesta, and feces were analyzed for Cr according to the procedure of Suzuki and Early (23). Duodenal and total tract flows of DM were calculated by dividing the amount of daily Cr intake by Cr concentration measured in duodenal and fecal samples. Nutrient flows were calculated by multiplying DM flow by the concentration of the nutrient in duodenal or fecal DM. Digestibilities, expressed as a percentage, were computed as the difference between nutrient intake and flows divided by intake. True ruminal DM digestibility was estimated by correcting duodenal DM flow for bacterial DM.

Bacterial pellet was analyzed for DM and N. Bacterial N flow to the duodenum was determined by purine analysis (29), as modified by Ushida et al. (24), of duodenal digesta and bacterial isolates. Ammonia N was measured by distillation of samples treated with MgO(1).

RESULTS

Intakes and Digestibilities of Nutrients

The FA content of the control diet was about 3.6% and was 6.6% for the fat-supplemented diets (Table 3). Total FA content measured in the fat-supplemented diets was about 0.7% (DM basis) lower than expected. Daily DM and OM intakes were numerically, but not significantly, lower for cows fed fat-supplemented diets by approximately 0.8 kg/d (Table 4). Apparent ruminal digestibility, rue ruminal digestibility, and total tract digestibility of both DM and OM were not affected by treatment. Intake, duodenal flow, apparent ruminal digestibility, and total tract digestibility of NDF were not affected by treatment, but again tended to be lower for cows fed the fat-supplemented diets.

TABLE 4

Intake and digestibility of DM, OM, and NDF of cows fed the control diet or diets supplemented with high oleic sunflower oil (HOSO), high linoleic sunflower oil (HLSO), or partially hydrogenated vegetable shortening (PHVS).

|  | Diet | | | | | Contrast[1] | | |
|---|---|---|---|---|---|---|---|---|
|  |  |  |  |  |  | C vs. F | O vs. L | L vs. S |
|  | Control | HOSO | HLSO | PHVS | SEM[2] | P | | |
| DM |  |  |  |  |  |  |  |  |
| Intake, kg/d | 19.9 | 19.4 | 19.0 | 19.0 | 0.5 | 0.23 | 0.61 | 0.95 |
| Duodenal flow, kg/d | 15.5 | 17.0 | 15.9 | 15.5 | 0.7 | 0.43 | 0.31 | 0.66 |
| Apparent ruminal digestibility, % | 22.8 | 13.1 | 17.4 | 17.5 | 4.7 | 0.26 | 0.54 | 0.99 |
| True ruminal digestibility, % | 41.1 | 31.8 | 36.4 | 35.5 | 3.4 | 0.16 | 0.44 | 0.78 |
| Total tract digestibility, % | 66.4 | 62.4 | 64.1 | 60.7 | 2.9 | 0.28 | 0.71 | 0.44 |
| OM |  |  |  |  |  |  |  |  |
| Intake, kg/d | 18.4 | 17.9 | 17.5 | 17.5 | 0.5 | 0.22 | 0.64 | 0.91 |
| Duodenal flow, kg/d | 13.0 | 14.3 | 13.3 | 12.9 | 0.6 | 0.48 | 0.30 | 0.59 |
| Apparent ruminal digestibility, % | 29.6 | 20.6 | 25.0 | 25.4 | 4.4 | 0.28 | 0.51 | 0.95 |
| True ruminal digestibility, % | 46.3 | 37.7 | 42.2 | 41.7 | 3.2 | 0.18 | 0.41 | 0.81 |
| Total tract digestibility, % | 67.4 | 63.4 | 65.0 | 61.9 | 2.8 | 0.27 | 0.70 | 0.46 |
| NDF |  |  |  |  |  |  |  |  |
| Intake, kg/d | 7.0 | 6.8 | 6.6 | 6.6 | 0.2 | 0.15 | 0.65 | 0.82 |
| Duodenal flow, kg/d | 3.8 | 3.7 | 3.5 | 3.6 | 0.3 | 0.43 | 0.60 | 0.77 |
| Apparent ruminal digestibility, % | 45.9 | 45.7 | 48.4 | 44.9 | 4.8 | 0.94 | 0.70 | 0.62 |
| Total tract digestibility, % | 53.2 | 49.8 | 51.6 | 46.9 | 4.1 | 0.46 | 0.77 | 0.45 |

[1]Contrasts: C vs. F = control versus fat (HOSO), HLSO, and PHVS), O vs. L = HOSO, and L vs. S = HLSO versus PHVS.
[2]Four observations per treatment.

Intakes of individual and total FA are presented in Table 5. Total fatty acid intake of cows fed fat-supplemented diets increased by 533 g/d over that of cows fed the control diet because of the additional fat. Individual FA intakes were reflective of the FA composition of the feed ingredients (Table 3) as well as the FA composition of the supplemental fats (Table 1). Cows fed the fat-supplemented diets consumed greater quantities of $C_{16:0}$, $C_{18:0}$, trans-$C_{18:1}$, cis-$C_{18:1}$, $C_{18:2}$, total $C_{18}$, and total FA. As expected, cows fed HOSO diets consumed greater cis-$C_{18:1}$ and less $C_{18:2}$ than did cows fed the PHVS diet. Fat supplementation increased trans-$C_{18:1}$ FA intake because of the trans-$C_{18:1}$ FA in the PHVS diet. Consumption of trans-$C_{18:1}$ FA was negligible for cows fed the control, HOSO, and HLSO diets, but was 188 g/d for cows fed the diet supplemented with PHVS.

Ruminal biohydrogenation of unsaturated $C_{18}$ FA in the diet was estimated from changes in the duodenum and intake of $C_{18:0}$, $C_{18:1}$, $C_{18:2}$, $C_{18:3}$, of total $C_{18}$ FA (28).

Biohydrogenation (percentage)=100−[100×(UFA/TFA)/(IUFA/ITFA)]

Where
UFA=duodenal flow of an individual unsaturated $C_{18}$ FA,
TFA=duodenal flow of total $C_{18}$ FA,

TABLE 5

Intake and flow of fatty acids (FA) to the duodenum of cows fed the control diet or diets supplemented with high oleic sunflower oil (HOSO), high linoleic sunflower oil (HLSO), or partially hydrogenated vegetable shortening (PHVS).

| | Diet | | | | | Contrast[1] | | |
|---|---|---|---|---|---|---|---|---|
| | | | | | | C vs. F | O vs. L | L vs. S |
| FA | Control | HOSO | HLSO | PHVS | SEM[2] | | P | |
| Intake, g/d | | | | | | | | |
| $C_{16:0}$ | 112 | 139 | 154 | 160 | 5 | 0.001 | 0.06 | 0.40 |
| $C_{16:1}$ | 2.9 | 2.7 | 2.9 | 2.8 | 0.1 | 0.41 | 0.34 | 0.61 |
| $C_{18:0}$ | 22 | 50 | 54 | 93 | 3 | 0.001 | 0.34 | 0.001 |
| trans-$C_{18:1}$ | 2.0 | 2.6 | 6.4 | 187.9 | 7.1 | 0.001 | 0.72 | 0.001 |
| cis-$C_{18:1}$ | 133 | 571 | 269 | 309 | 18 | 0.001 | 0.001 | 0.16 |
| $C_{18:2}$ | 353 | 408 | 664 | 360 | 25 | 0.006 | 0.001 | 0.001 |
| $C_{18:3}$ | 74 | 74 | 76 | 72 | 3 | 0.99 | 0.67 | 0.44 |
| Total $C_{18}$ | 584 | 1105 | 1069 | 1022 | 39 | 0.001 | 0.53 | 0.43 |
| Total | 722 | 1287 | 1259 | 1219 | 41 | 0.001 | 0.65 | 0.51 |
| Duodenal flow, g/d | | | | | | | | |
| $C_{16:0}$ | 162 | 194 | 187 | 202 | 10 | 0.02 | 0.61 | 0.29 |
| $C_{16:1}$ | 4.5 | 6.1 | 5.4 | 5.9 | 0.5 | 0.07 | 0.40 | 0.60 |
| $C_{18:0}$ | 457 | 744 | 680 | 636 | 30 | 0.001 | 0.18 | 0.34 |
| trans-$C_{18:1}$ | 64 | 287 | 295 | 266 | 37 | 0.002 | 0.89 | 0.61 |
| cis-$C_{18:1}$ | 74 | 106 | 83 | 108 | 17 | 0.24 | 0.336 | 0.33 |
| $C_{18:2}$ | 111 | 134 | 129 | 101 | 9 | 0.337 | 0.71 | 0.07 |
| $C_{18:3}$ | 15.2 | 12.9 | 14.1 | 14.4 | 1.1 | 0.33 | 0.49 | 0.85 |
| Total $C_{18}$ | 721 | 1284 | 1200 | 1126 | 46 | 0.001 | 0.25 | 0.30 |
| Total | 955 | 1553 | 1470 | 1410 | 59 | 0.001 | 0.36 | 0.49 |
| Biohydrogenation of unstaturated FA, % | | | | | | | | |
| cis-$C_{18:1}$ | 54.9 | 83.8 | 71.7 | 68.3 | 5.0 | 0.01 | 0.14 | 0.65 |
| $C_{18:2}$ | 74.6 | 73.0 | 83.0 | 74.6 | 1.2 | 0.15 | 0.001 | 0.003 |
| $C_{18:3}$ | 83.2 | 84.7 | 83.3 | 81.7 | 1.2 | 0.99 | 0.45 | 0.40 |
| Total $C_{18}$[3] | 71.1 | 79.5 | 80.1 | 72.7 | 1.6 | 0.01 | 0.80 | 0.02 |

[1]Contrasts: C vs. F = control versus fat (HOSO, HLSO, and PHVS), O vs. L = HOSO versus HLSO, and L vs. S = HLSO versus PHVS.
[2]Four observations per treatment.
[3]Includes cis-$C_{18:1}$, $C_{18:2}$, and $C_{18:3}$.

Flows of both individual and total FA to the duodenum were increased by the diets supplemented with fat (Table 5). Total FA flow to the duodenum for cows fed fat-supplemented diets increased 598, 515, and 455 g/d for HOSO, HLSO, and PHVS treatments, respectively, compared with cows fed the control diet. Cows fed the fat-supplemented diets had increased duodenal FA flows of $C_{16:0}$, $C_{16:1}$, $C_{18:0}$, trans-$C_{18:1}$, total $C_{18}$, and total FA compared with cows fed the control diet. Duodenal flows of $C_{18:0}$, trans-$C_{18:1}$ FA, cis-$C_{18:1}$, $C_{18:2}$ for cows receiving the HOSO and HLSO treatments were quite similar despite differences in intake of these FA The flow of $C_{18:2}$ was lower in cows fed the PHVS diet than in cows fed the LSO diet, which was a reflection of the differences in FA intakes of the corresponding treatments. The flow of trans-$C_{18:1}$ FA to the duodenum was greatly increased for cows fed the fat-supplemented diets compared with the cows fed the control diet (283 vs. 64 g/d; P<0.002); however, there was no effect of source of fat supplement.

IUFA=intake of an individual unsaturated $C_{18}$ FA, and
ITFA=intake of total $C_{18}$ FA.

Generally, as the degree of unsaturation increased, the extent of biohydrogenation increased, regardless of dietary treatment (Table 5). The one exception occurred for cows fed the HOSO diet for which biohydrogenation of $C_{18:2}$ was lower than that of cis-$C_{18:1}$. Biohydrogenation of cis-$C_{18:1}$ and total $C_{18}$ FA increased in cows fed the fat-supplemented diets compared with that in cows fed the control diet. Biohydrogenation of $C_{18:2}$ was greater for cows consuming the HLSO diet than in cows consuming the HOSO or PHVS diet. Biohydrogenation of $C_{18:3}$ was not affected by treatment. Cows fed the HLSO diet had greater biohydrogenation of total $C_{18}$ FA than did cows fed the PHVS diet.

The extent of biohydrogenation of unsaturated $C_{18}$ FA was also reflected by changes in the flow of $C_{18:0}$ and trans-$C_{18:1}$ FA to the duodenum. Flows of $C_{18:0}$ increased in cows fed the fat-supplemented diets as expected because of biohydrogenation of the supplemented fat in the diet. For cows fed the control diet, duodenal flow of $C_{18:0}$ was 63.3% of the total $C_{18}$ FA flow. Conversely, HOSO, HLSO, and PHVS treatments resulted in $C_{18:0}$ proportions of 58.5, 57.7, and 56.3% of the total $C_{18}$ FA duodenal flow, respectively (P<0.008; contrast not shown). These data indicate that the proportion of $C_{18:0}$ of total $C_{18}$ FA is decreased as the major en product of biohydrogenation when unsaturated FA are fed. The flow of trans-$C_{18:1}$ FA, the product of incomplete biohydrogenation, was greatly increased for cows fed all fat-supplemented diets regardless of source. As a proportion of total $C_{18}$ FA flow to the duodenum, trans-$C_{18:1}$ FA was increased from 9% of the total $C_{18}$ FA flow from cows fed the control diet to 23.5% of the total $C_{18}$ FA flow from cows fed the fat-supplemented diets. This result demonstrated that incomplete biohydrogenation occurred to a greater extent in cows fed fat-supplemented diets from which PUFA were supplied. In contrast, the increased flow of trans-$C_{18:1}$ FA measured in cows fed the PHVS diet versus that in cows fed the HOSO or HLSO diet was probably due to dietary intake rather than incomplete biohydrogenation.

Fecal FA (grams/day) did not differ for $C_{16:0}$, $C_{16:1}$, cis-$C_{18:1}$, and $C_{18:2}$ among treatments (Table 6). Fecal $C_{18:0}$, trans-$C_{18:1}$, total $C_{18}$, and total FA flows were greater in cows fed the fat-supplemented diets, which corresponded with greater duodenal flows of FA. Across fat treatments, cows fed PHVS diets had greater fecal trans-$C_{18:1}$ FA (P<0.09) than did cows fed HLSO diets.

tion (Table 5). Apparent digestibility of cis-$C_{18:1}$ in cows fed the LSO diet was lower (P<0.04) than that in cows fed the HOSO diet. Apparent digestibility of $C_{18:2}$ and $C_{18:3}$ was greater (P<0.04) for cows fed the LSO diet than for cows fed the HOSO or PHVS diet. Because of hydrogenation of unsaturated $C_{18}$ FA in the rumen, apparent digestibility of $C_{18:0}$ was negative for all diets, resulting from a large quantity of $C_{18:0}$ passing through the feces in comparison with consumption of $C_{18:0}$. The apparent digestibility of trans-$C_{18:1}$ FA was negative for all diets that provided little dietary trans-$C_{18:1}$ FA. For cows fed the PHVS diet, apparent digestibility of trans-$C_{18:1}$ FA was positive, indicating the disappearance of trans-$C_{18:1}$ FA from consumption of the diet to excretion in feces.

Apparent postruminal digestibilities (data not shown) of total FA were 74.3, 72.2, 72.5, and 70.2% for cows fed the control, HOSO, HLSO, and PHVS diets, respectively, and did not differ among diets. There were few significant effects caused by source of dietary fat on apparent postruminal digestibilities of individual FA Digestibility of cis-$C_{18:1}$ decreased for cows fed HLSO diets compared with cows fed HOSO or PHVS diets (69.8% vs. 82.0%: P<0.04), and $C_{18:2}$ decreased for cows fed PHVS diets compared with cows fed HLSO diets (74.4% vs. 83.5%; P<0.05). Although not significantly different, the fat-supplemented treatments tended to decrease apparent postruminal digestibility of C18:0 (63.9% vs. 75.4%), and increase digestibility of trans-$C_{18:1}$ FA in the small intestine (85.2% vs. 78.8%) more than the control treatment.

TABLE 6

Fecal fatty acids and total apparent digestibility of fatty acids by cows fed the control diet or diets supplemented with high oleic sunflower oil (HOSO), high linoleic sunflower oil (HLSO), or partially hydrogenated vegetable shortening (PHVS).

| | Diet | | | | | Contrast[1] | | |
|---|---|---|---|---|---|---|---|---|
| | | | | | | C vs. F | O vs. L | L vs. S |
| FA | Control | HOSO | HLSO | PHVS | SEM[2] | | P | |
| Fecal flow, g/d | | | | | | | | |
| $C_{16.0}$ | 40 | 48 | 50 | 56 | 6 | 0.14 | 0.80 | 0.52 |
| $C_{16.1}$ | 2.6 | 2.7 | 2.8 | 2.6 | 0.5 | 0.84 | 0.92 | 0.78 |
| $C_{18.0}$ | 125 | 258 | 241 | 240 | 29 | 0.01 | 0.69 | 0.99 |
| trans-$C_{18.1}$ | 14 | 41 | 33 | 47 | 5 | 0.003 | 0.31 | 0.09 |
| cis-$C_{18.1}$ | 18 | 18 | 23 | 19 | 3 | 0.61 | 0.33 | 0.37 |
| $C_{18.2}$ | 20 | 27 | 19 | 226 | 3 | 0.37 | 0.18 | 0.23 |
| $C_{18.3}$ | 2.5 | 2.9 | 1.7 | 2.7 | 0.4 | 0.91 | 0.06 | 0.11 |
| Total $C_{18}$ | 180 | 346 | 318 | 334 | 39 | 0.01 | 0.60 | 0.77 |
| Total | 249 | 426 | 399 | 421 | 48 | 0.02 | 0.67 | 0.74 |
| Total tract digestibility, % | | | | | | | | |
| $C_{16.0}$ | 63.4 | 65.1 | 67.6 | 65.0 | 5.30 | 0.70 | 0.75 | 0.75 |
| $C_{16.1}$ | 3.9 | 1.1 | -13.8 | -2.5 | 22.8 | 0.75 | 0.66 | 0.74 |
| $C_{18.0}$ | -477 | -414 | -350 | -159 | 102 | 0.20 | 0.67 | 0.23 |
| trans-$C_{18.1}$ | -884 | -1599 | -870 | 75 | 376 | 0.85 | 0.22 | 0.13 |
| cis-$C_{18.1}$ | 86.1 | 96.7 | 91.5 | 93.9 | 1.4 | 0.003 | 0.04 | 0.29 |
| $C_{18.2}$ | 94.3 | 93.5 | 97.1 | 92.8 | 0.8 | 0.87 | 0.02 | 0.01 |
| $C_{18.3}$ | 96.6 | 96.1 | 97.7 | 96.2 | 0.5 | 0.85 | 0.04 | 0.06 |
| Total $C_{18}$ | 68.7 | 68.4 | 70.2 | 67.2 | 5.5 | 0.99 | 0.82 | 0.71 |
| Total | 67.8 | 66.6 | 68.3 | 65.3 | 5.7 | 0.78 | 0.84 | 0.73 |

[1]Contrasts: C vs. F = control versus fat (HOSO, HLSO, and PHVS), O vs. L = HOSO, and L vs. S = HLSO versus PHVS.
[2]Four observations per treatment.

Apparent total tract digestibilities of $C_{16:0}$, $C_{16:1}$, $C_{18:0}$, trans-$C_{18:1}$, total $C_{18}$, and total FA were not affected by treatment (Table 6). The apparent digestibility of cis-$C_{18:1}$ was increased (P<0.003) in cows fed fat-supplemented diets compared with that in cows fed the control diet. This result was most likely due to increases in ruminal biohydrogena- Ruminal pH and VFA Ruminal pH and VFA concentrations, averaged across sampling times, are shown in Table 7. Ruminal pH did not differ among treatments. Cows fed supplemental fat had lower total VFA concentrations in the rumen (76.8 vs. 83.2 mM; P<0.07) and a higher molar proportion of propionate decreased (19.0% vs. 19.8%; P<0.03), and butyrate increased (12.5% vs. 11.3%; P<0.09), in cows fed PHVS diets compared with cows fed HOSO diets. There was no difference in ruminal VFA concentrations for cows fed HOSO diets compared with cows fed LSO diets.

(Table 8). Duodenal flow of total N, ammonia N, NAN, bacterial N, and nonammonia, Nonbacterial N were not altered by treatment. Efficiency of bacterial protein synthesis (grams of bacterial N per kilogram of OM truly digested)

TABLE 7

Ruminal pH and VFA concentration in cows fed the control diet or diets supplemented with high oleic sunflower oil (HOSO), high linoleic sunflower oil (HLSO), or partially hydrogenated vegetable shortening (PHVS).

|  | Diet | | | | | Contrast[1] | | |
|---|---|---|---|---|---|---|---|---|
|  | Control | HOSO | HLSO | PHVS | SEM[2] | C vs. F | O vs. L | L vs. S |
|  |  |  |  |  |  | P | | |
| pH | 6.60 | 6.51 | 6.62 | 6.48 | 0.09 | 0.58 | 0.36 | 0.25 |
| Total VFA, mM | 83.2 | 72.8 | 78.2 | 79.4 | 3.1 | 0.07 | 0.22 | 0.78 |
| VFA, mol/100 mol | | | | | | | | |
| Acetate | 64.3 | 64.3 | 64.3 | 64.0 | 0.6 | 0.86 | 0.97 | 0.65 |
| Propionate | 19.0 | 20.0 | 19.8 | 19.0 | 0.3 | 0.09 | 0.70 | 0.03 |
| Isobutyrate | 0.81 | 0.85 | 0.84 | 0.78 | 0.05 | 0.85 | 0.88 | 0.46 |
| Butyrate | 11.8 | 10.9 | 11.3 | 12.5 | 0.5 | 0.63 | 0.57 | 0.09 |
| Isovalerate | 1.71 | 1.63 | 1.60 | 1.62 | 0.07 | 0.28 | 0.84 | 0.87 |
| Valerate | 1.62 | 1.60 | 1.56 | 1.56 | 0.06 | 0.54 | 0.61 | 0.94 |

[1]Contrasts: C vs. F = control versus fat (HOSO, HLSO, and PHVS), O vs. L = HOSO versus HLSO, and L vs. S = HLSO vs. PHVS.
[2]Four cows per treatment; seven repeated measures.

N Metabolism

Intake of N was lower for cows fed fat-supplemented diets (660 vs. 619 g/d) because of lower DMI for those diets was not affected by dietary fat. Fecal N and apparently digested N in the total tract did not differ across treatments.

TABLE 8

Digestion and microbial flow of N to the small intestine of cows fed the control diet or diets supplemented with high oleic sunflower oil (HOSO), high linoleic sunflower oil (HLSO), or partially hydrogenated vegetable shortening (PHVS).

|  | Diet | | | | | Contrast[1] | | |
|---|---|---|---|---|---|---|---|---|
|  | Control | HOSO | HLSO | PHVS | SEM[2] | C vs. F | O vs. L | L vs. S |
|  |  |  |  |  |  | P | | |
| Intake, g/d | 660 | 628 | 617 | 612 | 11 | 0.02 | 0.53 | 0.74 |
| Duodenal flow, g/d | | | | | | | | |
| Total N | 697 | 705 | 678 | 684 | 33 | 0.84 | 0.60 | 0.91 |
| Ammonia N | 48 | 53 | 51 | 51 | 3 | 0.28 | 0.74 | 0.99 |
| NAN | 649 | 652 | 627 | 633 | 31 | 0.74 | 0.59 | 0.91 |
| Bacterial N | 287 | 269 | 273 | 251 | 21 | 0.38 | 0.90 | 0.48 |
| Nonammonia, nonbacterial N | 362 | 383 | 354 | 381 | 18 | 0.63 | 0.30 | 0.32 |
| Duodenal flow, g/100 g of N | | | | | | | | |
| Ammonia N | 6.8 | 7.4 | 7.6 | 7.5 | 0.3 | 0.07 | 0.67 | 0.78 |
| NAN | 93.2 | 92.6 | 92.4 | 92.5 | 0.3 | 0.07 | 0.67 | 0.78 |
| Bacterial N | 41.3 | 38.5 | 40.4 | 36.8 | 1.6 | 0.20 | 0.43 | 0.17 |
| Bacterial synthesis, g of N/kg of OMTD[3] | 35.1 | 42.8 | 39.1 | 36.5 | 6.0 | 0.55 | 0.67 | 0.77 |
| Fecal N, g/d | 207 | 211 | 201 | 213 | 16 | 0.93 | 0.67 | 0.60 |
| Total tract digestibility, % | 68.9 | 66.5 | 67.8 | 64.9 | 2.5 | 0.42 | 0.71 | 0.44 |

[1]Contrasts: C vs. F = control versus fat (HOSO, HLSO and PHVS), O vs. L = HOSO, and L vs. S HLSO versus PHVS.
[2]Four observations per treatment.
[3]OM truly digested in the rumen.

Milk Production and Composition

Cows fed diets with supplemental fat had lower milk (P<0.06) and 3.5% FCM (P<0.02) production (Table 9). Milk fat percentage tended to decrease for cows fed fat-supplemented diets compared with cows fed the control diet (3.48% vs. 3.21%) but was not significant. Fat and protein production was reduced (P<0.03) for cows diets supplemented with fat. Source of fat supplementation did not alter milk fat and milk protein percentage or production.

that were supplemented with fat resulted in lower (P<0.01) weight percentages and yields of $C_{14:0}$, $C_{15:0}$, $C_{16:0}$, $C_{17:0}$, and $C_{18:3}$. Fat increased (P<0.01) the concentration of cis-$C_{18:1}$ present in milk, but did not alter yield. The concentration of $C_{18:2(n-6)}$ did not change, but the yield of $C_{18:2(n-6)}$ decreased (P<0.004) for cows fed fat treatments compared with the yield for cows fed the control treatment. Cows fed fat-supplemented diets produced milk with a greater concentration (11.2% vs. 2.9%; P<0.004) and yield

TABLE 9

Body weight of cows and production and composition of milk from cows fed the control diet or diets supplemented with high oleic sunflower oil (HOSO), high linoleic sunflower oil (HLSO), or partially hydrogenated vegetable shortening (PHVS).

|  | Diet | | | | | Contrast[1] | | |
|---|---|---|---|---|---|---|---|---|
|  | Control | HOSO | HLSO | PHVS | SEM[2] | C vs. F | O vs. L | L vs. S |
|  |  |  |  |  |  | P | | |
| BW, kg | 690 | 698 | 696 | 705 | 7 | 0.25 | 0.89 | 0.41 |
| Milk, kg/d | 26.1 | 23.9 | 25.3 | 22.9 | 0.8 | 0.06 | 0.26 | 0.07 |
| 3.5% FCM, kg/d | 26.1 | 21.8 | 24.2 | 22.3 | 0.9 | 0.02 | 0.11 | 0.20 |
| Milk components, % | | | | | | | | |
| Fat | 3.48 | 3.07 | 3.18 | 3.38 | 0.14 | 0.14 | 0.61 | 0.33 |
| Protein | 3.53 | 3.41 | 3.41 | 3.47 | 0.07 | 0.26 | 0.99 | 0.56 |
| Lactose | 4.75 | 4.67 | 4.73 | 4.54 | 0.10 | 0.40 | 0.64 | 0.21 |
| Production, kg/d | | | | | | | | |
| Fat | 0.91 | 0.71 | 0.81 | 0.76 | 0.04 | 0.03 | 0.14 | 0.46 |
| Protein | 0.92 | 0.81 | 0.85 | 0.78 | 0.03 | 0.03 | 0.33 | 0.18 |
| Lactose | 1.24 | 1.10 | 1.20 | 1.04 | 0.05 | 0.07 | 0.22 | 0.06 |

[1]Contrasts: C vs. F = control versus fat (HOSO, HLSO, and PHVS), O vs. L = HOSO versus HLSO, and L vs. S = HLSO versus PHVS.
[2]Four observations per treatment.

Concentrations and daily yield of individual FA in milk are shown in Table 10. Milk produced from cows fed diets (81 vs. 26 g/d; P<0.001) of trans-$C_{18:1}$ FA than did cows fed the control diet.

TABLE 10

Fatty acid (FA) concentration and production of milk from cows fed the control diet or diets supplemented with high oleic sunflower oil (HOSO), high linoleic oil (HLSO), or partially hydrogenated vegetable shortening (PHVS).

| FA | Diet | | | | | Contrast[1] | | |
|---|---|---|---|---|---|---|---|---|
|  | Control | HOSO | HLSO | PHVS | SEM2 | C vs. F | O vs. L | L vs. S |
|  |  |  |  |  |  | P | | |
| (g/100 g of fat) | | | | | | | | |
| $C_{14:0}$ | 13.0 | 8.9 | 10.0 | 9.6 | 0.5 | 0.001 | 0.23 | 0.63 |
| $C_{15:0}$ | 1.21 | 0.89 | 0.90 | 0.94 | 0.03 | 0.001 | 0.94 | 0.41 |
| $C_{16:0}$ | 32.2 | 22.0 | 3.7 | 26.3 | 0.7 | 0.001 | 0.10 | 0.03 |
| $C_{16:1}$ | 2.2 | 1.8 | 1.6 | 2.3 | 0.2 | 0.17 | 0.49 | 0.04 |
| $C_{17:0}$ | 0.59 | 0.47 | 0.47 | 0.49 | 0.02 | 0.003 | 0.90 | 0.44 |
| $C_{18:0}$ | 12.0 | 13.7 | 13.8 | 12.2 | 0.6 | 0.12 | 0.83 | 0.09 |
| trans-$C_{18:1}$ | 2.9 | 11.8 | 11.0 | 10.8 | 1.6 | 0.004 | 0.75 | 0.91 |
| cis-$C_{18:1}$ | 22.4 | 28.5 | 24.8 | 25.9 | 1.0 | 0.01 | 0.03 | 0.44 |
| $C_{18-21}$ | 1.0 | 2.1 | 2.2 | 1.8 | 0.2 | 0.002 | 0.77 | 0.11 |
| $C_{18:2(n-6)}$ | 4.2 | 4.0 | 4.5 | 3.3 | 0.3 | 0.47 | 0.29 | 0.03 |
| $C_{18:3}$ | 0.80 | 0.61 | 0.63 | 0.60 | 0.04 | 0.007 | 0.75 | 0.68 |
| $C_{20:4}$ | 0.15 | 0.15 | 0.13 | 0.14 | 0.03 | 0.77 | 0.52 | 0.80 |
| (g/d) | | | | | | | | |
| C14:0 | 118 | 66 | 83 | 73 | 8 | 0.002 | 0.16 | 0.39 |
| C15:0 | 10.9 | 6.4 | 7.3 | 7.1 | 0.6 | 0.001 | 0.28 | 0.76 |
| C16:0 | 293 | 159 | 195 | 199 | 14 | 0.001 | 0.12 | 0.85 |

TABLE 10-continued

Fatty acid (FA) concentration and production of milk from cows fed the control diet or diets supplemented with high oleic sunflower oil (HOSO), high linoleic oil (HLSO), or partially hydrogenated vegetable shortening (PHVS).

| | Diet | | | | | Contrast[1] | | |
|---|---|---|---|---|---|---|---|---|
| | | | | | | C vs. F | O vs. L | L vs. S |
| FA | Control | HOSO | HLSO | PHVS | SEM2 | | P | |
| $C_{16:1}$ | 21 | 13 | 13 | 17 | 1.6 | 0.02 | 0.89 | 0.12 |
| $C_{17:0}$ | 5.3 | 3.3 | 3.8 | 3.7 | 0.2 | 0.001 | 0.10 | 0.89 |
| $C_{18:0}$ | 110 | 98 | 113 | 92 | 6 | 0.25 | 0.14 | 0.05 |
| trans-$C_{18:1}$ | 26 | 79 | 81 | 82 | 7 | 0.001 | 0.85 | 0.90 |
| cis-$C_{18:1}$ | 201 | 201 | 206 | 198 | 14 | 0.98 | 0.79 | 0.67 |
| $C_{18\text{-}2I}$ | 9 | 14 | 16 | 14 | 0.9 | 0.001 | 0.19 | 0.20 |
| $C_{18:2(n\text{-}6)}$ | 37 | 27 | 35 | 25 | 1.6 | 0.004 | 0.01 | 0.005 |
| $C_{18:3}$ | 7.3 | 4.3 | 5.2 | 4.8 | 0.3 | 0.001 | 0.09 | 0.38 |
| $C_{20:4}$ | 1.2 | 1.0 | 1.1 | 1.0 | 0.3 | 0.54 | 0.95 | 0.87 |

[1]Contrasts: C vs. F = control versus fat (HOSO, HLSO, and PHVS), O vs. L = HOSO versus HLSO, and L vs. S = HLSO versus PHVS.
[2]Four observations per treatment.
[3]Isomers.

Because of the source of the fat treatment, cows fed the HOSO diet produced milk with greater concentrations of cis-$C_{18:1}$ ($P<0.03$), but lower concentrations of $C_{16:0}$ ($P<0.10$), than did cows fed the HLSO diet. Cows fed the HOSO diet also produced milk with lower daily yields of $C_{18:2(n\text{-}6)}$ ($P<0.01$) and $C_{18:3}$ ($P<0.09$) than did cows fed the LSO diet primarily because of decreased milk production. Comparing milk composition from cows fed HLSO and PHVS diets, cows fed the HLSO diet had lower concentrations of $C_{16:0}$ and $C_{16:1}$ in milk, but greater concentrations and yields of $C_{18:0}$ and $C_{18:2(n\text{-}6)}$.

DISCUSSION

The net balance of total FA flow from intake to duodenal passage appears to vary with no known association with the characteristics of a specific fat, such as source, degree of unsaturation, or extent of ruminal protection (7). Although cows fed diets that were not supplemented with fat commonly have net increases of FA across the rumen (7, 15), cows fed different types of fats increase, decrease, or do not change the flow of FA to the duodenum (7, 15, 27, 28). Net increases of total FA across the rumen in the current study were 233, 266, 211, and 191 g/d higher than FA intake for cows fed control, HOSO, HLSO, and PHVS treatments, respectively. The net increase of FA could be accounted for from bacterial de novo lipid synthesis in the rumen (7, 11, 26) and possibly, bile contamination of duodenal digesta or other endogenous sources (17, 26).

Flow of trans-$C_{18:1}$ FA into the small intestine compared with dietary intake increased for cows fed diets containing fat treatments; there was no effect of source. Duodenal flow of trans-$C_{18:1}$ FA for cows fed the HLSO and PHVS diets was four times greater than that for cows fed the control diet. Increases in the flow of trans-$C_{18:1}$ FA to the duodenum resulted from incomplete biohydrogenation for cows fed HLSO diets. For cows fed the PHVS diets, dietary consumption of trans-$C_{18:1}$ FA was responsible for increases in duodenal flow. Unexpectantly, duodenal flow of trans-$C_{18:1}$ for cows fed HOSO diets was comparable with flows in cows fed HLSO and PHVS diets, which might have been due to sufficient PUFA that were available for biohydrogenation even in the HOSO diet. It generally is assumed that cis-$C_{18:1}$ is converted directly to stearic acid and that trans-$C_{18:1}$ FA is not an intermediate in this process (11, 12). In agreement with previous research, Wonsil et al. (27) found duodenal trans-$C_{18:1}$ FA flows for cows fed diets supplemented with menhaden fish oil or soybean oil to be four times greater than duodenal flows for cows fed the control or hydrogenated tallow diets. Increased flows for trans-$C_{18:1}$ FA were attributed to incomplete hydrogenation of PUFA (27). Ruminal biohydrogenation of $C_{18:2}$ was increased in cows fed the HLSO diet. Possibly this was due to increased accessibility of $C_{18:2}$ to rumen microorganisms of the lipids in the oil portion of the diet than of lipids contained in cellular structures of concentrates and forages as suggested by Ferlay et al. (8). Similarly, biohydrogenation of cis-$C_{18:1}$ in cows fed the HOSO diet was also higher than that in cows fed the other dietary treatments. Biohydrogenation of the $C_{18}$ unsaturated FA for cows fed the control diet followed a similar pattern compared with the control diets reported in previous research (13, 28).

The extent to which dietary unsaturated FA are biohydrogenated depends on environmental conditions in the rumen. Factors such as the FA composition of the diet, species of the ruminal bacteria, and pH of the ruminal fluid may influence how unsaturated FA are biohydrogenated. Research completed in vitro (Example 2) and in vivo (13) has suggested that low ruminal pH may interfere with the ruminal biohydrogenation pathway, reducing the conversion of trans-$C_{18:1}$ FA to stearic acid in the final step of biohydrogenation, and consequently, causing an accumulation of trans-$C_{18:1}$ FA in the ruminal fluid. This factor was not present in the current example because ruminal pH ranged from 6.48 to 6.62 and did not differ among dietary treatments. In this experiment trans-$C_{18:1}$ FA accumulated because of the large amount of dietary PUFA that was available as substrate. Therefore, ruminal pH and substrate availability are two important factors that affect ruminal accumulation of trans-$C_{18:1}$ FA.

Milk fat percentage was numerically decreased for cows fed HOSO and HLSO diets; however, no depression was observed for cows fed PHVS diets. In previous experiments, milk fat depression resulted in cows fed soybean oil (3), whole sunflower seeds (5), Ca salts of FA (6), and menhaden fish oil (27), all sources of fat that are high in PUFA. Milk fat depression has also been observed in cows fed sources of dietary trans-$C_{18:1}$ FA, including hydrogenated vegetable oil (22, 27), ruminally protected hydrogenated soybean oil (2), and abomasally infused vegetable shortening (9, 18).

Milk fat from cows fed the PHVS diet contained high levels of trans-$C_{18:1}$ FA in the milk and total milk fat production was reduced, but milk fat percentage was not affected. A recent study by Chouinard et al. (6) compared Ca salts of canola oil, soybean oil, and linseed oil supplemented at the rate of 4% of the total diet to dairy cows. AU three fat treatments resulted in an increased percentage of trans-$C_{18:1}$ FA in milk and reduced milk fat percentage; however, the greatest increase in the percentage of trans-$C_{18:1}$ FA in milk came from cows fed the Ca salts of soybean oil (10.75 percentage units) followed by linseed oil (8.34 percentage units) and canola oil (6.58 percentage units), whereas the largest reduction in milk fat percentage was from cows fed the Ca salts of canola oil (1.38 percentage units) followed by soybean oil (1.07 percentage units) and linseed oil (0.49 percentage units). These studies suggest that although increased levels of trans-$C_{18:1}$ FA in the milk are always seen during milk fat depression, there is not a constant relationship between trans-$C_{18:1}$ FA in milk and the degree of milk fat depression. Commercially hydrogenated vegetable fats contain a broad distribution of positional trans-$C_{18:1}$ FA isomers from n-2 to n-12, the largest proportions of which are n-7, n-8, and n-9 isomers (19). Ruminal biohydration of unsaturated FA also results in numerous positional isomers of trans-$C_{18:1}$ FA, but the predominant trans-$C_{18:1}$ FA isomer is the n-7 isomer, vaccenic acid (4, 14). Although vaccenic acid was also the dominant positional isomer of trans-$C_{18:1}$ FA throughout the blood plasma and into milk fat in the goat (4), it is possible that other positional isomers may be causative factor in reducing milk fat production. (See example 5)

In summary, from the above, duodenal flow of trans-$C_{18:1}$ FA was increased for cows fed all supplemental fat diets. Increased flow of trans-$C_{18:1}$ FA from cows fed HOSO and HLSO diets resulted from incomplete biohydration in the rumen, but the increased flow of trans-$C_{18:1}$ FA from cows fed the PHVS diet was most likely from the diet. Trans-$C_{18:1}$ FA were subsequently absorbed in the small intestine and incorporated into milk fat at equal amounts regardless of the source of the supplemental fat. Fat supplementation reduced milk fat production regardless of source. Cows fed HOSO and HLSO diets produced a lower milk fat percentage, but cows fed PHVS diets did not. In conclusion, trans-C18:1 FA are present during milk fat depression caused by dietary fat addition, but increased amounts of trans-$C_{18:1}$ FA incorporated into milk fat does not necessarily translate into a proportional reduction in milk fat

EXAMPLE 2

The object of this study was to show the effects of the amounts of dietary concentrate and buffer addition on duodenal flow, apparent adsorption, and milk fat incorporation of trans-$C_{18:1}$ fatty acids. (See Kalscheur et. al, "Effect of Fat Source on Duodenal Flow of Trans-$C_{18:1}$ Fatty Acids and Milk Fat Production in Dairy Cows" J. Dairy Science 80:2115–2126 (1997) herein incorporated by reference)

MATERIALS AND METHODS

Cows, Experimental Design, and Treatments

Four multiparous Holstein cows averaging 131 DIM at the beginning of the experiment were fitted with ruminal and duodenal (T-type gutter channel) cannulas. Duodenal cannulas (plasticol) were inserted proximal to the common bile and pancreatic duct, approximately 10 cm distal to the pylorus. Dietary treatments consisted of two levels of forage, high (HF; 60%, DM basis) and low (LF; 25%, DM basis) and two levels of buffer, no buffer and 2% buffer. Buffer treatment consisted of 1.5% $NaHCO_3$ and 0.5% MgO supplemented for corn in the total mixed diet (DM basis). Treatments were applied in a 2×2 factorial arrangement within a 4×4 Lain square design.

Ingredient and nutrient compositions of the diets are presented in Table 11. The forage portion of each diet consisted of 60% corn silage and 40% alfalfa haylage. The diets were formulated to meet NRC (16) guidelines for milk production at 40 kg with 3.8% fat for all nutrients except fiber in the LF diet. The DM percentage of forage and concentrate was determined weekly, and the total mixed diets were adjusted accordingly to maintain a constant forage to concentrate ratio on a DM basis. The FA composition of the dietary ingredients and the calculated FA composition of the total mixed diets are presented in Table 12.

TABLE 11

Ingredient and chemical composition of total mixed diets for cows fed diets that contained high (HF) and low (LF) proportions of forage with (B) or without buffer (NB).

| | (% of DM) | | | |
|---|---|---|---|---|
| | HF | | LF | |
| Composition | NB | B | NB | B |
| Corn silage | 36.0 | 36.0 | 15.0 | 15.0 |
| Alfalfa haylage | 24.0 | 24.0 | 10.0 | 10.0 |
| Ground corn | 20.5 | 13.7 | 51.9 | 49.9 |
| Soyplus ®[1] | 17.0 | 16.9 | 8.8 | 8.8 |
| Soybean meal (48% CP) | — | — | 11.0 | 11.0 |
| Dicalcium phosphate | 0.9 | 0.9 | 0.8 | 0.8 |
| Limestone | 0.5 | 0.5 | 1.2 | 1.2 |
| NaCl | 0.4 | 0.4 | 0.4 | 0.4 |
| Dynamate ®[2] | 0.4 | 0.4 | 0.6 | 0.6 |
| KCl | — | — | 0.1 | 0.1 |
| Trace mineral and vitamin mix[3] | 0.2 | 0.2 | 0.2 | 0.2 |
| MgO | — | 0.5 | — | 0.5 |
| $NaHCO_3$ | — | 1.5 | — | 1.5 |
| Chemical | | | | |
| DM % | 44.0 | 44.0 | 61.7 | 61.7 |
| OM | 92.1 | 91.1 | 92.6 | 91.3 |
| CP | 18.9 | 18.3 | 19.0 | 19.2 |
| NDF | 35.3 | 34.8 | 22.0 | 22.1 |
| ADF | 20.1 | 19.8 | 10.3 | 10.4 |
| Ca | 0.94 | 0.94 | 0.96 | 0.97 |
| P | 0.55 | 0.55 | 0.57 | 0.61 |
| Mg | 0.26 | 0.49 | 0.27 | 0.49 |
| K | 2.05 | 2.01 | 1.51 | 1.52 |
| Na | 0.18 | 0.56 | 0.25 | 0.60 |
| $Ne_1$,[4] Mcal/kg of DM | 1.66 | 1.62 | 1.80 | 1.76 |

[1]Soyplus/West Central (Ralston, IA).
[2]Pitman-Moore, Inc. (Chicago, IL); guaranteed analysis: 22% S, 18% K, and 11% Mg.
[3]Formulated to provide (per kilogram of dietary DM) 3000 IU of vitamin A, 500 IU of vitamin D, 10 IU of vitamin E, 50 mg of Fe, 40 mg of Zn, 40 mg of Mn, 10 mg of Ca, 0.6 mg of I, and 0.3 mg of Se.
[4]Calculated from NRC (16).

TABLE 12

Fatty acid (FA) composition of concentrates, forages, and total mixed diets for cows fed diets that contained high (HF) and low (LF) proportions of forage with (B) or without buffer (NB).

| | Concentrate mix | | | | | | Diet | | | |
| --- | --- | --- | --- | --- | --- | --- | --- | --- | --- | --- |
| | HF | | LF | | Corn | Alfalfa | HF | | LF | |
| FA | NB | B | NB | B | silage | haylage (% of DM) | NB | B | NB | B |
| $C_{16:0}$ | 0.755 | 0.784 | 0.669 | 0.698 | 0.573 | 0.606 | 0.606 | 0.617 | 0.626 | 0.647 |
| $C_{16:1}$ | 0.006 | 0.002 | 0.001 | 0.004 | 0.015 | 0.039 | 0.017 | 0.016 | 0.007 | 0.010 |
| $C_{18:0}$ | 0.200 | 0.254 | 0.130 | 0.180 | 0.067 | 0.067 | 0.128 | 0.168 | 0.117 | 0.153 |
| trans-$C_{18:1}$ | ND[1] | ND | ND | ND | 0.004 | ND | 0.001 | 0.001 | 0.001 | 0.001 |
| cis-$C_{18:1}$ | 1.203 | 1.207 | 1.022 | 1.078 | 0.523 | 0.078 | 0.684 | 0.686 | 0.841 | 0.880 |
| $C_{18:2}$ | 3.074 | 2.941 | 2.493 | 2.516 | 1.281 | 0.431 | 1.784 | 1.732 | 2.078 | 2.092 |
| $C_{18:3}$ | 0.368 | 0.345 | 0.186 | 0.182 | 0.172 | 0.843 | 0.409 | 0.400 | 0.253 | 0.250 |
| Other[2] | 0.059 | 0.040 | 0.014 | 0.042 | 0.082 | 0.297 | 0.143 | 0.116 | 0.080 | 0.120 |
| Total | 5.661 | 5.573 | 4.513 | 4.700 | 2.614 | 2.363 | 3.773 | 3.737 | 4.013 | 4.153 |

[1]Not detected.
[2]Includes $C_{14:0}$, $C_{17:0}$, and $C_{\geq 20:0}$.

Experimental Procedure

Each experimental period consisted of 3 wk of which the first 16 d were used as an adjustment period. Cows were housed in individual tie stalls and were fed for ad libitum intake (allowing for 5 to 10% orts) once daily at 0800 h. At each feeding, diet ingredients were thoroughly mixed (Steiner Roll-A-Mix; Steiner Corp., Orrville, Ohio). Feed intakes and orts were recorded daily. Samples of corn silage, alfalfa haylage, and concentrates fed to each cow and orts from each cow were collected on d 17 to 20 of each period, composited, oven-dried at 65° C., and ground through a Wiley mill (1-mm screen; Arthur H. Thomas, Philadelphia, Pa.) for later analysis. Milk production was recorded at each milking (0100 and 1230 h). Morning and evening milkings were sampled during the last 3 d (six consecutive milkings) of each period. Cows were exercised each morning from 0600 to 0800 h. Body weight was recorded weekly at 100 h every Tuesday.

From d 11 to 21 of each period, $Cr_2O_3$ was mixed with the concentrate portion of the diet at a rate of approximately 20 g/d per cow based on previous DM intake to measure duodenal nutrient flow and to calculate total tract digestibility. Actual $Cr_2O_3$ intake was determined by chemical analysis of feeds and orts. Duodenal and fecal samples (250 ml) were collected every 4 or 6 h during d 19 to 21 such that a composite of 12 samples represented sampling every 2 h over a 24-h period. Duodenal samples were collected after discarding the first surge of digesta to help reduce bile contamination. Duodenal samples were frozen at −20° C., thawed, composited, and freeze-dried before being ground through a 1-mm screen.

Ruminal fluid samples for VFA and pH were collected every 2 h over a 12-h duration on d 21 of each experimental period beginning just before the morning feeding. Samples were collected from five distinct locations: the anterior blind sac, dorsal blind sac, upper and lower forage mat, and liquid phase of the ventral sac using a stainless steel sampling probe (10 ml of ruminal fluid per location). Ruminal fluid pH was determined by glass electrode, acidified to pH<2 with 1 ml of 50% (vol/vol) $H_2SO_4$, and frozen for VFA analysis.

Ruminal samples for isolating bacteria were obtained on d 21 of each period at 0, 4, 8, and 12 h after the morning feeding. Whole ruminal contents, acquired from the anterior, dorsal and midventral regions of the rumen, were squeezed through four layers of cheesecloth, five hundred milliliters of the strained ruminal fluid were collected at each sampling, combined with 125 ml of 0.90% NaCl and 37% formaldehyde solution to preserve rumen bacteria, and refrigerated at 5° C. until centrifugation to isolate bacteria. Remaining ruminal contents were returned to the cow. Composited samples were centrifuged at 500 (g for 15 min at 4° C. to remove feed particles and protozoa. The supernatant was centrifuged at 20,000 (g for 20 min at 4< C., washed with 0.9% NaCl, recentrifuged, and rinsed with distilled water to isolate the bacteria from the suspension. The remaining pellet was frozen, freeze-dried, and ground through a 1-mm screen for later analysis.

Analytical Procedures

Composited samples of alfalfa haylage, corn silage, concentrates, orts, duodenal digesta, and feces were analyzed for DM (100° C. for 24 h), OM (2), and N by the micro-Kjeldahl procedure (2). Feed samples were additionally analyzed for NDF (29), ADF (10), Ca, P, Mg, K, and Na (Northeast DHIA Forage Analysis Laboratory, Ithaca, N.Y.). Long-chain FA compositions of feed, fecal, duodenal, and milk samples were quantified by GLC as described by Gaynor et al. (8), except that feed, fecal, and duodenal methyl esters were purified through a silicic acid column (Bio-Sil A 100–200 mesh; Bio-Rad Laboratories, Hercules, Calif.) to remove contaminants prior to GLC analysis. Individual milk samples were analyzed for fat, protein, and lactose by Environmental Systems Services (College Park, Md.) using infrared analysis (Foss Milkoscan 104AB; Foss Food Technology Corp., Eden Prairie, Minn.). Ruminal VFA concentrations were determined by gas chromatography (Sigma 300; Perkin-Elmer Corp., Norwalk, Conn.) using ethyl butyrate as an internal standard in a 2-m glass column packed with GP 15% SP-1220/1% $H_3PO_4$ on 100/120 Chromosorb® (Supelco Inc., Bellefonte, Pa.). Helium was the carrier gas and the injector, column, and detector temperatures were 200, 140, and 220° C., respectively.

Concentrates, orts, duodenal digesta, and feces were analyzed for Cr according to the procedure of Suzuki and Early (26). Duodenal and total tract flows of DM were calculated by dividing the amount of daily Cr intake by Cr concentration measured in duodenal and fecal samples. Nutrient flows were calculated by multiplying DM flow by the concentration of the nutrient in duodenal or fecal DM. Digestibilities, expressed as a percentage, were computed as the difference between nutrient intake and flows divided by intake. True ruminal DM digestibility was estimated by correcting duodenal DM flow for bacterial DM.

Bacterial pellet was analyzed for DM and N. Bacterial N flow to the duodenum was determined by purine analysis (32), as modified by Ushida et al. (28), of duodenal digesta and bacterial isolates. Ammonia N was measured by distillation of samples treated with MgO (2).

RESULTS

Intakes and Digestibilities of Nutrients

Dry matter and OM intakes were 2.7 and 2.5 kg/d higher ($P<0.01$), respectively, for cows fed LF diets (Table 13), and NDF intakes were 2.2 kg/d higher ($P<0.001$) for cows fed HF diets because of the increased forage in the diet. There was a forage (buffer interaction ($P<0.09$) for which the LF diet without buffer decreased apparent ruminal DM digestibility compared with other diets (11.4% vs. 28.1%). The trend for the effect of the LF diet without buffer on apparent ruminal OM digestibility was similar to that shown for ruminal DM digestibility. Apparent ruminal NDF digestibility was lower for cows fed LF diets ($P<0.001$), but greater for cows diets with added buffer ($P<0.010$). There was a forage (buffer interaction for DM ($P<0.07$) and OM ($P<0.08$) flows to the duodenum because of reduced ruminal DM and OM digestibility for cows fed the LF diet without buffer compared with cows fed the other dietary treatments. True ruminal DM and OM digestibilities corrected for bacterial DM and OM flow resulted in greater ruminal disappearance of DM (47.3% vs. 38.6%; $P<0.05$) and OM (52.5% vs. 43.3%; $P<0.05$) for cows fed the HF diets than cows fed the LF diets. Total tract digestibility of NDF was lower for cows fed the LF diets ($P<0.007$).

TABLE 13

Intake and digestibility of DM, OM, and NDF of cows fed diets that contained high (HF) and low (LF) proportions of forage with (B) or without buffer (NB).

|  | HF | | LF | | | Effect[1] | | |
|---|---|---|---|---|---|---|---|---|
|  | NB | B | NB | B | SEM[2] | F | B | F × B |
|  | | | | | | P | | |
| DM | | | | | | | | |
| Intake, kg/d | 20.6 | 21.9 | 23.7 | 24.1 | 0.8 | 0.01 | 0.37 | 0.66 |
| Duodenal flow, kg/d | 14.8 | 15.1 | 21.3 | 17.9 | 0.8 | 0.001 | 0.11 | 0.07 |
| Apparent ruminal digestibility, % | 27.8 | 30.3 | 11.4 | 26.2 | 3.1 | 0.02 | 0.03 | 0.09 |
| True ruminal digestibility, % | 46.8 | 47.7 | 33.5 | 43.6 | 3.6 | 0.05 | 0.18 | 0.25 |
| Total tract digestibility, % | 67.7 | 67.9 | 61.5 | 65.2 | 2.6 | 0.14 | 0.49 | 0.53 |
| OM | | | | | | | | |
| Intake, kg/d | 19.1 | 19.9 | 21.9 | 22.0 | 0.7 | 0.01 | 0.55 | 0.60 |
| Duodenal flow, kg/d | 12.3 | 12.5 | 18.3 | 15.1 | 0.8 | 0.001 | 0.11 | 0.08 |
| Apparent ruminal digestibility, % | 35.2 | 36.8 | 18.0 | 31.9 | 3.3 | 0.02 | 0.06 | 0.11 |
| True ruminal digestibility, % | 52.3 | 52.6 | 38.5 | 48.0 | 3.7 | 0.05 | 0.17 | 0.26 |
| Total tract digestibility, % | 68.6 | 68.8 | 62.8 | 66.6 | 2.8 | 0.21 | 0.50 | 0.55 |
| NDF | | | | | | | | |
| Intake, kg/d | 7.3 | 7.6 | 5.2 | 5.3 | 0.2 | 0.001 | 0.29 | 0.60 |
| Duodenal flow, kg/d | 2.9 | 2.7 | 3.3 | 2.8 | 0.3 | 0.42 | 0.29 | 0.54 |
| Apparent ruminal digestibility, % | 60.7 | 63.2 | 37.6 | 48.0 | 3.3 | 0.001 | 0.10 | 0.28 |
| Total tract digestibility, % | 54.4 | 54.6 | 27.2 | 34.7 | 5.9 | 0.007 | 0.54 | 0.56 |

[1]F = Forage proportion, B = buffer addition, and F × B = forage by buffer interaction.
[2]Four observations per treatment

Statistical Analysis

All data except ruminal pH and VFA were analyzed as a 4×4 Latin square using PROC GLM of SAS (22). The statistical model included the effect of cow, period, forage level, buffer, and forage (buffer interaction. Time and time (treatment interactions were added to the model for ruminal pH and VFA and anayzed using PROC MIXED of SAS (21).

Intake and duodenal flow of individual and total FA are presented in Table 14. As expected, cows fed LF diets consumed greater $C_{16:0}$, cis-$C_{18:1}$, $C_{18:2}$, total $C_{18}$, and total FA, but reduced $C_{16:1}$ and $C_{18:3}$, reflecting changes in FA composition of LF diets in addition to changes in DMI. There were negligible amounts of trans-$C_{18:1}$ FA in the diet, and total intakes were <1 g/d regardless of dietary treatment.

TABLE 14

Intake and flow of fatty acids (FA) to the duodenum of cows fed diets that contained high (HF) and low (LF) proportions of forage with (B) or without buffer (NB).

| | HF | | LF | | | Effect[1] | | |
| --- | --- | --- | --- | --- | --- | --- | --- | --- |
| | | | | | | F | B | F × B |
| | NB | B | NB | B | SEM[2] | | P | |
| Intake, g/d | | | | | | | | |
| $C_{16:0}$ | 126 | 134 | 149 | 156 | 6 | 0.01 | 0.28 | 0.96 |
| $C_{16:1}$ | 3.5 | 3.4 | 1.5 | 2.2 | 0.3 | 0.002 | 0.31 | 0.23 |
| $C_{18:0}$ | 27 | 37 | 28 | 37 | 4 | 0.83 | 0.05 | 0.91 |
| trans-$C_{18:1}$ | 0.34 | 0.36 | 0.13 | 0.16 | 0.12 | 0.14 | 0.86 | 0.99 |
| cis-$C_{18:1}$ | 145 | 151 | 204 | 215 | 9 | 0.001 | 0.37 | 0.77 |
| $C_{18:2}$ | 379 | 381 | 501 | 510 | 17 | 0.001 | 0.77 | 0.85 |
| $C_{18:3}$ | 83 | 85 | 58 | 58 | 3 | 0.001 | 0.71 | 0.72 |
| Total $C_{18}$ | 634 | 654 | 791 | 820 | 30 | 0.002 | 0.44 | 0.88 |
| Total | 789 | 811 | 954 | 996 | 36 | 0.002 | 0.40 | 0.79 |
| Duodenal flow, g/d | | | | | | | | |
| $C_{16:0}$ | 156 | 163 | 208 | 197 | 7 | 0.001 | 0.75 | 0.23 |
| $C_{16:1}$ | 4.2 | 6.0 | 7.0 | 4.9 | 0.4 | 0.10 | 0.87 | 0.004 |
| $C_{18:0}$ | 439 | 456 | 535 | 551 | 21 | 0.005 | 0.49 | 0.96 |
| trans-$C_{18:1}$ | 61 | 57 | 120 | 66 | 10 | 0.01 | 0.02 | 0.04 |
| cis-$C_{18:1}$ | 84 | 88 | 140 | 116 | 8 | 0.002 | 0.26 | 0.12 |
| $C_{18:2}$ | 86 | 84 | 166 | 109 | 1.1 | 0.003 | 0.03 | 0.04 |
| $C_{18:3}$ | 11.2 | 10.7 | 12.9 | 8.6 | 1.0 | 0.86 | 0.05 | 0.10 |
| Total $C_{18}$ | 682 | 695 | 975 | 850 | 35 | 0.001 | 0.16 | 0.09 |
| Total | 916 | 946 | 1288 | 1131 | 41 | 0.001 | 0.17 | 0.06 |
| Biohydrogenation of unsaturated FA, % | | | | | | | | |
| cis-$C_{18:1}$ | 46.4 | 44.7 | 44.9 | 48.1 | 2.2 | 0.67 | 0.75 | 0.31 |
| $C_{18:2}$ | 79.0 | 79.3 | 73.3 | 79.3 | 1.2 | 0.05 | 0.03 | 0.05 |
| $C_{18:3}$ | 87.8 | 88.1 | 81.9 | 85.9 | 1.0 | 0.006 | 0.07 | 0.11 |
| Total $C_{18}$[3] | 72.4 | 72.1 | 66.4 | 71.2 | 1.2 | 0.03 | 0.11 | 0.80 |

[1]F = Forage proportion, B = buffer addition, and F × B = forage by buffer interaction.
[2]Four observations per treatment.
[3]Includes cis-$C_{18:1}$, $C_{18:2}$, and $C_{18:3}$.

Flow of both individual and total FA to the duodenum was increased by the LF diets (Table 14) because of increased FA intake. Forage (buffer interactions existed for $C_{16:1}$, trans-$C_{18:1}$ FA, $C_{18:2}$, $C_{18:3}$, total $C_{18}$, and total FA because of elevated levels of FA flow in cows fed LF diets without buffer. Flow of $C_{16:0}$, $C_{18:0}$ and cis-$C_{18:1}$ increased for cows fed LF diets. Increased FA flow in cows fed the LF diet without buffer reflected not only increased FA intake, but also the low ruminal DM digestibility (Table 13) resulting from the LF diet without buffer.

The extent of biohydrogenation of unsaturated $C_{18}$ FA was reflected by changes in flow of $C_{18:0}$ to the duodenum as a percentage of the total $C_{18}$ FA flow. Duodenal $C_{18:0}$ flow was 55% of the total $C_{18}$ FA flow for cows fed the LF diet without buffer compared with 65% of $C_{18}$ FA flow for cows fed the other diets. The flow of trans-$C_{18:1}$ FA was 120 g/d for cows fed the LF diet without buffer (P<0.04) compared with 57 to 66 g/d for cows fed the other diets as a result of less complete ruminal biohydrogenation. Flows of $C_{18:2}$ (P<0.04) and $C_{18:3}$ (P<0.10) were increased in cows fed the LF diet without buffer compared with flows of $C_{18:2}$ and $C_{18:3}$ in cows fed other diets, again indicating reduced biohydrogenation for unsaturated $C_{18}$ FA cows fed the LF diet without buffer.

Ruminal biohydrogenation of unsaturated $C_{18}$ FA in the diet can be estimated from changes in the duodenum and intake of $C_{18:0}$, $C_{18:1}$, $C_{18:2}$, and $C_{18:3}$ of total $C_{18}$ FA (31).

Biohydrogenation (percentage)=100−[100×(UFA/TFA)/(IUFA/ITFA)]

Where
UFA=duodenal flow of an individual unsaturated $C_{18}$ FA,
TFA=duodenal flow of total $C_{18}$ FA,
IUFA=intake of an individual unsaturated $C_{18}$ FA, and
ITFA=intake of total $C_{18}$ FA.

It should be noted that using this index of biohydrogenation, incomplete biohydrogenation of $C_{18:3}$ and $C_{18:2}$ would be reflected in lower apparent biohydrogenation $C_{18:2}$ and $C_{18:1}$. Within $C_{18}$ FA, as the degree of unsaturation increased, the extent of biohydrogenation increased, regardless of dietary treatment. Biohydrogenation of $C_{18:2}$, $C_{18:3}$, and total $C_{18}$ FA was decreased in the LF diet without buffer compared with that in other dietary treatments. Biohydrogenation of cis-$C_{18:1}$ was not affected by treatment (Table 14).

Fecal FA (grams/day) did not differ for $C_{16:1}$, $C_{18:0}$, $C_{18:3}$, total $C_{18}$, and total FA among treatments (Table 15). Fecal $C_{16:0}$, cis-$C_{18:1}$, and $C_{18:2}$ flows were greater in cows fed LF diets which corresponded with greater duodenal flows of FA There was a forage (buffer interaction (P<0.03) for fecal trans-$C_{18:1}$ FA for which trans-$C_{18:1}$ FA were higher for cows fed the LF diet without buffer than for cows fed other dietary treatments.

Apparent total tract digestibility of $C_{16:0}$, cis-$C_{18:1}$, total $C_{18}$, and total FA was not affected by forage or buffer treatment (Table 15). High concentrate diets decreased apparent digestibility of $C_{18:2}$ and $C_{18:3}$ compared with HF diets. This result was most likely due to reductions in ruminal biohydrogenation for these FA (Table 14). Apparent digestibility of $C_{18:0}$ in cows fed diets without added buffer was lower than that in cows fed diets with added buffer. Because of hydrogenation of unsaturated $C_{18}$ FA in the rumen, apparent digestibility of $C_{18:0}$ was negative for all diets, resulting from a large quantity of $C_{18:0}$ passing through the feces in comparison with consumption of $C_{18:0}$. Apparent postruminal digestibilities of individual and total FA did not differ among treatments (data not presented).

lower in cows fed LF diets (P<0.02). Addition of buffer increased ruminal pH by 0.19 units for cows fed the LF diet compared with only 0.02 units for cows fed the HF diets (P<0.07). Ruminal pH decreased with time after feeding for all treatments (P<0.001) (FIG. 1). With the exception of the 0-h sampling time, ruminal pH for cows fed the LF diet without buffer was lower than that for cows fed the other three diets. The addition of buffer to the LF diet resulted in a greater increase in ruminal pH than the addition of buffer to the HF diet.

TABLE 15

Fecal fatty acids and total tract apparent digestibilities of fatty acids by cows fed diets that contained high (HF) and low (LF) proportions of forage with (B) or without buffer (NB).

| | HF | | LF | | | Effect[1] | | |
| --- | --- | --- | --- | --- | --- | --- | --- | --- |
| | | | | | | F | B | F × B |
| | NB | B | NB | B | SEM[2] | P | | |
| Fecal flow, g/d | | | | | | | | |
| $C_{16:0}$ | 36 | 38 | 52 | 44 | 6 | 0.10 | 0.66 | 0.40 |
| $C_{16:1}$ | 1.2 | 1.6 | 1.3 | 1.7 | 0.4 | 0.46 | 0.64 | 0.61 |
| $C_{18:0}$ | 93 | 105 | 136 | 103 | 21 | 0.33 | 0.72 | 0.38 |
| trans-$C_{18:1}$ | 9.1 | 11.9 | 18.8 | 10.1 | 2.1 | 0.10 | 0.20 | 0.03 |
| cis-$C_{18:1}$ | 17 | 18 | 32 | 26 | 4 | 0.02 | 0.52 | 0.37 |
| $C_{18:2}$ | 18 | 16 | 37 | 27 | 6 | 0.04 | 0.35 | 0.48 |
| $C_{18:3}$ | 2.1 | 1.7 | 2.4 | 1.7 | 0.3 | 0.65 | 0.13 | 0.65 |
| Total $C_{18}$ | 139 | 153 | 227 | 173 | 30 | 0.12 | 0.53 | 0.30 |
| Total | 206 | 222 | 314 | 247 | 37 | 0.12 | 0.51 | 0.29 |
| Total tract digestibility, % | | | | | | | | |
| $C_{16:0}$ | 71.7 | 71.3 | 66.5 | 71.6 | 2.8 | 0.41 | 0.43 | 0.36 |
| $C_{16:1}$ | 63.4 | 68.8 | 1.1 | 7.7 | 28.0 | 0.07 | 0.84 | 0.98 |
| $C_{18:0}$ | −250 | −193 | −371 | −190 | 44 | 0.23 | 0.03 | 0.21 |
| cis-$C_{18:1}$ | 88.4 | 88.1 | 84.9 | 87.6 | 1.1 | 0.12 | 0.32 | 0.21 |
| $C_{18:2}$ | 95.4 | 95.8 | 93.0 | 94.6 | 0.9 | 0.08 | 0.28 | 0.48 |
| $C_{18:3}$ | 97.5 | 98.0 | 96.0 | 97.1 | 0.5 | 0.04 | 0.15 | 0.55 |
| Total $C_{18}$ | 78.0 | 76.5 | 72.3 | 79.0 | 3.2 | 0.65 | 0.45 | 0.25 |
| Total | 73.8 | 72.5 | 68.1 | 75.3 | 3.1 | 0.66 | 0.38 | 0.22 |

[1]F = Forage proportion, B = buffer addition, and F × B = forage by buffer interaction.
[2]Four observations per treatment.

Ruminal pH and VFA

Ruminal pH and VFA concentrations, averaged across sampling times, are shown in Table 16. Ruminal pH was

TABLE 16

Ruminal pH and VFA concentrations of cows fed diets that contained high (HF) and low (LF) proportions of forage with (B) or without buffer (NB).

| | HF | | LF | | | Effect[1] | | |
| --- | --- | --- | --- | --- | --- | --- | --- | --- |
| | | | | | | F | B | F × B |
| | NB | B | NB | B | SEM[2] | P | | |
| pH | 6.13 | 6.15 | 5.83 | 6.02 | 0.04 | 0.002 | 0.04 | 0.07 |
| Total VFA, mM | 89.0 | 97.2 | 110.1 | 112.3 | 3.5 | 0.002 | 0.18 | 0.41 |
| VFA, mol/100 mol | | | | | | | | |
| Acetate | 64.2 | 62.2 | 58.0 | 58.5 | 1.2 | 0.006 | 0.57 | 0.34 |
| Proprionate | 20.5 | 22.7 | 26.5 | 24.4 | 1.3 | 0.02 | 0.98 | 0.15 |
| Isobutyrate | 0.74 | 0.80 | 0.54 | 0.69 | 0.11 | 0.21 | 0.36 | 0.67 |
| Butyrate | 10.8 | 10.6 | 11.6 | 12.6 | 0.6 | 0.04 | 0.51 | 0.30 |
| Isovalerate | 1.42 | 1.62 | 1.25 | 1.56 | 0.13 | 0.41 | 0.09 | 0.70 |
| Valerate | 1.72 | 1.70 | 1.75 | 1.85 | 0.16 | 0.62 | 0.80 | 0.74 |

[1]F = Forage proportion, B = buffer addition, and F × B = forage by buffer interaction.
[2]Four cows per treatment; seven repeated measures.

As expected, total VFA concentration in the rumen increased in cows fed the LF diets (Table 16). The molar proportion of acetate was decreased (58.3% vs. 63.3%), propionate was increased (25.5% vs. 21.6%), and butyrate was increased (12.1% vs. 10.7%) in cows fed LF diets compared with proportions of those acids in cows fed HF diets. Buffer addition did not affect VFA concentrations.

N Metabolism

Intake of N was higher for cows fed LF diets than for cows fed HF diets (731 vs. 635 g/d) because of higher DMI for cows fed LF diets (Table 17). Duodenal flows of total N ($P<0.001$), ammonia N ($P<0.02$), NAN ($P<0.001$), bacterial N ($P<0.005$), and nonammonia, nonbacterial N ($P<0.008$) were increased for cows fed the LF diets. Buffer addition decreased the flow of total N ($P<0.005$), ammonia N ($P<0.03$), and NAN ($P<0.007$). Also, there was a forage (buffer interaction for which total N ($P<0.009$), ammonia N ($P<0.009$), and NAN ($P<0.02$) were increased in cows fed LF diet without buffer compared with those in cows fed other dietary treatments. These changes most likely were due to increased DM flow for cows fed the LF diet without buffer because of the low ruminal digestibility of DM.

fed the LF diet without buffer ($P<0.008$) compared with other diets. Increased forage ($P<0.001$) and buffer addition ($P<0.003$) reduced bacterial efficiency. Fecal N, primarily caused by increased N intake was higher for cows fed LF diets ($P<0.04$). Apparently digested N in the total tract tended to be lower for cows fed the LF diet without buffer.

Milk Production and Composition

Milk production and 3.5% FCM were not affected by treatment (Table 18). Milk fat percentage was reduced for cows fed the LF treatments compared with cows fed the HF treatments (3.67% vs. 4.16%; $P<0.01$). Buffer addition increased milk fat percentage (3.76% vs 4.07%; $P<0.07$). The increase in milk fat percentage caused by buffer was numerically greater for cows fed the LF diet than for cows fed the HF diet. Milk protein percentage tended to be higher for cows fed the LF diets (3.71% vs. 3.61%; $P<0.11$). The

TABLE 17

Digestion of N and microbial flow to the small intestine of cows fed diets that contain high (HF) and low (LF) proportions of forage with (B) or without (NB).

| | HF | | LF | | | Effect[1] | | |
| | NB | B | NB | B | SEM[2] | F | B | F × B |
| --- | --- | --- | --- | --- | --- | --- | --- | --- |
| | | | | | | | P | |
| Intake, g/d | 634 | 635 | 717 | 745 | 24 | 0.007 | 0.58 | 0.60 |
| Duodenal flow, g/d | | | | | | | | |
| Total N | 674 | 666 | 930 | 797 | 16 | 0.001 | 0.005 | 0.009 |
| Ammonia N | 53 | 55 | 72 | 54 | 3 | 0.02 | 0.03 | 0.009 |
| NAN | 621 | 611 | 858 | 743 | 16 | 0.001 | 0.007 | 0.02 |
| Bacterial N | 300 | 295 | 425 | 351 | 21 | 0.005 | 0.11 | 0.16 |
| Nonammonia, nonbacterial N | 321 | 316 | 433 | 392 | 24 | 0.008 | 0.38 | 0.49 |
| Duodenal flow, g/100 g of N | | | | | | | | |
| Ammonia N | 7.7 | 8.3 | 7.7 | 6.8 | 0.4 | 0.06 | 0.64 | 0.07 |
| NAN | 92.3 | 91.7 | 92.3 | 93.2 | 0.4 | 0.06 | 0.64 | 0.07 |
| Bacterial N | 44.6 | 44.2 | 45.5 | 44.2 | 2.4 | 0.88 | 0.73 | 0.86 |
| Bacterial synthesis, g of N/kg of OMTD[3] | 31.2 | 29.1 | 50.6 | 33.4 | 2.0 | 0.001 | 0.003 | 0.008 |
| Fecal N, g/d | 184 | 191 | 255 | 225 | 20 | 0.04 | 0.600 | 0.40 |
| Total tract digestibility, % | 71.0 | 69.9 | 64.9 | 69.3 | 2.1 | 0.17 | 0.46 | 0.25 |

[1]F = Forage proportion, B = buffer addition, and F × B = forage by buffer interaction.
[2]Four observation per treatment.
[3]OM truly digested in the rumen.

Efficiency of bacterial protein synthesis (gram of bacterial N per kilogram of OM truly digested) was higher for cows production of milk components was not affected by treatment.

TABLE 18

Body weight, milk production, and milk composition of cows fed diets that contained high (HF) and low (LF) proportion of forage with (B) or without buffer (NB).

| | HF | | LF | | | Effect[1] | | |
| | NB | B | NB | B | SEM[2] | F | B | F × B |
| --- | --- | --- | --- | --- | --- | --- | --- | --- |
| | | | | | | | P | |
| BW, kg | 645 | 642 | 643 | 643 | 4 | 0.90 | 0.74 | 0.70 |
| Milk, kg/d | 28.1 | 29.3 | 31.5 | 29.8 | 1.3 | 0.18 | 0.85 | 0.29 |
| 3.5% FCM, kg/d | 30.8 | 32.3 | 30.9 | 31.1 | 1.5 | 0.70 | 0.58 | 0.67 |

TABLE 18-continued

Body weight, milk production, and milk composition of cows fed diets that contained high (HF) and low (LF) proportion of forage with (B) or without buffer (NB).

|  | HF | | LF | | | Effect[1] | | |
|---|---|---|---|---|---|---|---|---|
|  | NB | B | NB | B | SEM[2] | F | B | F × B |
|  |  |  |  |  |  | P | | |
| Milk components, % | | | | | | | | |
| Fat | 4.09 | 4.22 | 3.42 | 3.91 | 0.14 | 0.01 | 0.07 | 0.25 |
| Protein | 3.63 | 3.59 | 3.74 | 3.68 | 0.05 | 0.11 | 0.38 | 0.92 |
| Lactose | 4.78 | 4.71 | 4.80 | 4.86 | 0.07 | 0.23 | 0.90 | 0.37 |
| Production, kg/d | | | | | | | | |
| Fat | 1.14 | 1.21 | 1.07 | 1.12 | 0.07 | 0.27 | 0.42 | 0.92 |
| Protein | 1.02 | 1.05 | 1.15 | 1.07 | 0.04 | 0.12 | 0.59 | 0.22 |
| Lactose | 1.34 | 1.37 | 1.49 | 1.44 | 0.06 | 0.13 | 0.90 | 0.55 |

[1]F = Forage proportion, B = buffer addition, and F × B = forage by buffer interaction.
[2]Four observations per treatment.

Concentrations and the daily yield of individual FA in milk are shown in Table 19. There were small but significant effects of buffer and forage on $C_{15:0}$, $C_{16:0}$, $C_{18:0}$, $C_{18:2}$, and $C_{18:3}$ concentrations in milk fat. The concentration of trans-$C_{18:1}$ FA in milk was greater for cows fed the LF diet without buffer than for cows fed the other dietary treatments (5.8% vs. 3.0%; P<0.06). The yield of trans-$C_{18:1}$ FA in milk was also greater for cows fed the LF diet without buffer than for cows fed the other diets (56 vs. 33 g/d; P<0.06).

TABLE 19

Milky fatty acid concentration and fatty acid production of cows fed diets that contained high (HF) and low (LF) proportions of forage with (B) or without buffer (NB).

|  | HF | | LF | | | Effect[1] | | |
|---|---|---|---|---|---|---|---|---|
|  | NB | B | NB | B | SEM[2] | F | B | F × B |
|  |  |  |  |  |  | P | | |
| (g/100 g of fat) | | | | | | | | |
| $C_{14:0}$ | 12.4 | 12.9 | 12.8 | 12.9 | 0.3 | 0.48 | 0.33 | 0.41 |
| $C_{15:0}$ | 1.3 | 1.3 | 1.7 | 1.5 | 0.13 | 0.08 | 0.71 | 0.33 |
| $C_{16:0}$ | 32.3 | 33.6 | 29.2 | 31.1 | 0.7 | 0.005 | 0.05 | 0.70 |
| $C_{16:1}$ | 2.1 | 2.0 | 2.2 | 2.0 | 0.1 | 0.43 | 0.30 | 0.75 |
| $C_{17:0}$ | 0.65 | 0.64 | 0.67 | 0.60 | 0.02 | 0.68 | 0.08 | 0.18 |
| $C_{18:0}$ | 12.0 | 11.5 | 10.0 | 12.1 | 0.6 | 0.29 | 0.24 | 0.06 |
| trans-$C_{18:1}$ | 3.1 | 2.9 | 5.8 | 2.9 | 0.6 | 0.07 | 0.05 | 0.06 |
| cis-$C_{18:1}$ | 23.6 | 22.4 | 22.4 | 23.3 | 0.5 | 0.77 | 0.80 | 0.09 |
| $C_{18:2_0}$ | 0.65 | 0.57 | 0.67 | 0.51 | 0.05 | 0.60 | 0.07 | 0.48 |
| $C_{18:2(n-6)}$ | 4.1 | 3.9 | 5.2 | 4.6 | 0.2 | 0.003 | 0.06 | 0.21 |
| $C_{18:3}$ | 0.70 | 0.71 | 0.61 | 0.49 | 0.03 | 0.004 | 0.14 | 0.11 |
| $C_{20:1}$ | 0.21 | 0.25 | 0.30 | 0.23 | 0.04 | 0.41 | 0.68 | 0.24 |
| (g/d) | | | | | | | | |
| $C_{14:0}$ | 128 | 154 | 128 | 144 | 11 | 0.95 | 0.18 | 0.49 |
| $C_{15:0}$ | 13 | 16 | 18 | 17 | 1.7 | 0.10 | 0.55 | 0.34 |
| $C_{16:0}$ | 336 | 399 | 315 | 352 | 33 | 0.35 | 0.18 | 0.70 |
| $C_{16:1}$ | 21 | 24 | 23 | 23 | 1.5 | 0.70 | 0.50 | 0.40 |
| $C_{17:0}$ | 6.9 | 7.6 | 7.2 | 6.8 | 0.6 | 0.75 | 0.85 | 0.42 |
| $C_{18:0}$ | 127 | 137 | 106 | 135 | 15 | 0.47 | 0.23 | 0.56 |
| trans-$C_{18:1}$ | 33 | 33 | 56 | 33 | 5 | 0.07 | 0.07 | 0.06 |
| cis-$C_{18:1}$ | 248 | 265 | 234 | 261 | 23 | 0.71 | 0.38 | 0.83 |
| $C_{18:2_0}$ | 6.7 | 6.6 | 6.8 | 5.6 | 0.8 | 0.62 | 0.44 | 0.49 |
| $C_{18:2(n-6)}$ | 43 | 46 | 55 | 51 | 4 | 0.07 | 0.89 | 0.44 |
| $C_{18:3}$ | 7.6 | 8.3 | 6.3 | 5.5 | 0.8 | 0.04 | 0.92 | 0.37 |
| $C_{20:1}$ | 1.9 | 2.8 | 3.7 | 2.5 | 0.6 | 0.28 | 0.82 | 0.18 |

[1]F = Forage proportion, B = buffer addition, and F × B = forage by buffer interaction
[2]Four observation per treatment.
[3]Isomers.

From the above, high grain diets not only provide polyunsaturated FA required to form trans-$C_{18:1}$ FA as a result of incomplete biohydrogenation, but also alter the ruminal environment, which favors incomplete biohydrogenation and production of trans-$C_{18:1}$ FA. Low pH appears to be a factor that results in inhibition of the last step of FA biohydrogenation, the conversion of trans-$C_{18:1}$ FA to stearic acid. Dietary buffers increase ruminal pH when cows are fed high grain diets. Consequently, trans-$C_{18:1}$ FA flow to the duodenum is reduced in cows fed dietary buffers, and milk fat depression is alleviated.

EXAMPLE 3

In the course of studies, the inventor group has learned that tFA production in the rumen is controlled by the rumen pH and the source of dietary fats and oils. In addition several studies in animals and in mammalian tissue culture lines showed there to be more 18:2 present than would have been predicted based on the diet or media composition used to culture the cells. One explanation for this is that the desaturase enzymes present in the tissues were producing the 18:2 fatty acids from the 18:1 fatty acids. (This is not the normal source of these 18:2 FA. Generally 18:2 FA are considered "essential" in the diets of mammalian cells) (Subdoh et al., Cliff, Kalponia).

Supporting Information for Example 3

In Atal, et. al, "Comparison of Body Weight and Adipose Tissue in Male C57 B 1/6J Mice Fed Diets, With and Without Trans Fatty Acids" Lipids, Vol. 29, No. 5 (1994) and Panigrahi et al., "Effects of Trans fatty Acids on Lipid Accumulations in 3T3-LI cells" LIPIDS, Vol. 28, No. 12 (1992) (both references herein incorporated by reference) the ratio of 18:2 to 20:4 in lipids is altered when mice or adipose cells are 'fed' trans fatty acid containing diets. It is generally observed that the production of 18:2 and 20:4 are interfered with by consuming 18:1 trans acids. These results are seen below:

| Study | Species | Polar Lipid 18:2/20:4 ratio | | | Non-Polar Lipid 18:20/20:4 ratio | | |
|---|---|---|---|---|---|---|---|
| | | cis | trans | | cis | trans | |
| Atal | C57B1/6J Mouse Fat Pad | 1.9 | 1.8 | | 41 | 91 | |
| Panigrahi | 3T3 cells Pre-adiposites | 1.6 | 1.9 | P < 0.05 | 8 | 12 | P < 0.05 |
| | 3T3 Differen-tiating | 1.7 | 2.5 | P < 0.05 | 10 | 14 | P < 0.05 |
| Caughman Leydig | MLTC-1 Tumor Cells Differen-tiating | 0.13 | 0.27 | | 2 | 5 | |

The alteration in 18:2/20:4 ratios can be due to more 18:2 or less 20:4. There was no evidence that the 20:4 is decreased so one interpretation would be that the 18:2 is increased. This could be due to decreased elongation and desaturation to 20:4 (the standard explanation) due to the effects of tFA, or to increased amounts of 18:2. Since 18:2 can only come from the diet and those levels were the same, then an increased presence of 18:2 could be due to synthesis from dietary cis 12 18:1 which would be desaturated at the delta 9 position. Thus CLA's (9c, 11t CLAa) are formed from C18 delta 11t.

In a student thesis by Cliff Caughman, 1987, MS thesis, *Trans Fatty acid metabolism in Murine Leydig Tumor Cells (MLTC-1)*, (herein incorporated by reference) one of the inventors noticed that there was more 18:2n-6 present in the experimental cells (grown on a trans fatty acid containing media) than in those grown in the control treatment. Even though there was less fat in the experimental media 3383 µg, compared to the control 3553 µg, there was more 18:2 present at the end of the growth period when the media and cells were considered. The control conditioned media+cells had 218 µg 18:2 while the experimental conditioned media+cells had 378 µg 18:2 present (a difference of 160 µg). Likewise there was more 20:4n-6 (arachidonic) present in the experimental vials (~37 for control and ~47 for experimental) which indicates that there was not an inhibition in conversion of 18:2 to 20:4. This evidence coupled with a recent publication by Salminen et. al., "Dietary Trans Fatty Acids Increase Conjugated Linoleic Acid Levels in Human Serum" J. Nutr. Biochem., 1998, Vol. 9, pg. 93–98 (February) herein incorporated by reference, i.e. subjects fed PHVO is confirmation of the in vivo conversion of 18:1's to 18:2's.

EXAMPLE 4

Study 1) In a recent study the inventive group reviewed isomer distribution under different diet conditions and obtained the following results. American Dairy Science Association 1997 @ Guelph, Ontario, Canada Diet: HC=25% forage: 75% concentrate (corn etc)
    LC=60% forage: 40% concentrate
Buffer 1.5% $NaHCO_3$ and 0.5% MgO
    Sodium bicarbonate and magnesium oxide
Design: HC or LC diets with/without buffer 2×2 factorial
    4×4 Latin Square.
    Four multiparous rumen fistulated cows in mid lactation.
Results: Rumen pH lowered when fed HC diets.
    Rumen ph increased with buffer ~0.2 pH units
    Milk fat decreased with HC diet (p=0.01).
    Buffer addition increased milk fat from 3.3% to 4.00/0 in HC group.
    Milk tFA decreased from 5.7 to 2.9% during HC trt with buffer (buffer×forage p=0.001).
    Trans 18:1 delta 5,6,7,8,9 isomers were small components and the total did not change with diet trt.
    t-10 isomer ranged between 11 and 25% and was highest with the HC diets.
    t-10 and t-12 peaks showed a buffer×Forage interaction.
    t-15 responded to buffer and forage independently.
    t-11 was always the major peak (×33%) and was lower in the presence of buffer.
Conclusions: Diet not only had an effect on the total tFA contained in milk but also on milk fat isomer distribution.
Study 2. A Preliminary/Feasibility Study of Cow Mammary Enzyme Activities.
Design: Feed HC or LC diets.
    Three cows fed each diet. Recover mammary tissue at slaughter.

Enzyme assays for Fatty Acid Synthase (FAS), Acetyl CoA Carboxylase (ACC) and Glucose-6-phosphate Dehydrogenase (G-6-P dH)

RUMINAL pH AND MILK PRODUCTION OF COWS FED LOW OR HIGH CONCENTRATE DIETS WITH OR WITHOUT BUFFER

| Parameter | Low Concentrate | | High Concentrate | | P< | |
|---|---|---|---|---|---|---|
| | No Buffer | B | No Buffer | B | Conc | Buffer* |
| pH | 6.1 | 6.1 | 5.8 | 6.0 | 0.002 | 0.04 |
| Milk, kg/d | 28 | 29 | 32 | 30 | 0.08 | 0.85 |
| Fat % | 4.1 | 4.2 | 3.4 | 3.9 | 0.01 | 0.07 |
| 3.5% FCM, kg/d | 31 | 32 | 31 | 31 | 0.7 | 0.6 |
| % tFA in milk fat | 3.1 | 2.9 | 5.8 | 2.9 | 0.07 | 0.05 |
| tFA g/d | 33 | 33 | 56 | 33 | 0.07 | 0.07 |

* No significant interactions.

Results:

| Enzyme | LC Diet Crude Homogenate | HC Diet Crude Homogenate | % Change Biopsy 1997 LC vs HC | % Decrease Biopsy 1997 |
|---|---|---|---|---|
| FAS | | | | 54% |
| u/ml homogenate | 0.81 | 0.56 | ↓69% | |
| u/mg tissue | 2.3 | 1.7 | ↓74% | |
| ACC | | | | 61% |
| u/ml homogenate | 0.79 | 0.5 | ↓67% | |
| u/mg tissue | 2.3 | 1.4 | ↓61% | |
| G-6-PdH | | | | nd |
| u/ml homogenate | 0.55 | 0.73 | ↑25% | |
| u/mg tissue | 0.03 | 0.04 | ↑25% | |

Study 3.1997 Biopsy Study
  Design: 2×2 Single Reversal
  12 multiparous cows in midlactation
  Two week preliminary period fed CT diet
  Two week experimental periods fed either CR (control ration) or HCS (high concentrate soy oil) diets
  Biospsy taken at the end of each treatment period
  Milk composites of the last three days of each trt were analyzed for FA composition, fat, protein, etc.
  Assays for ACC, FAS and ACC mRNA abundance were run for each diet trt.

The results show the enzyme activity involved in milk fat formation by the mammary gland is affected by diet. High concentrate diets reduce the activity of fat producing enzymes thus fewer short chain fatty acids are made and incorporated into the milk. High concentrated diets with oil added produced tFA. The tFA decrease the fat synthesizing enzymes in the mammary gland; at the same time, these tFA themselves are incorporated into the milk fat both as t18:1 and CLA tFA's.

Results:

| Parameter | CT Diet | HCS Diet | P< | % Decrease |
|---|---|---|---|---|
| % Milk Fat | 3.0 ± 0.17 | 1.7 ± 0.17 | 0.0004 | 57% |
| % tFA in Milk Fat | 1.9 ± 1.18 | 15.6 ± 1.18 | 0.0001 | ^8x |

Results:

| Parameter | CT Diet | HCS Diet | P< | % Decrease |
|---|---|---|---|---|
| FAS enzyme activity | 13.2 ± 0.62 | 7.5 ± 0.62 | 0.0001 | 57% |
| ACC enzyme activity | 9.7 ± 0.3 | 3.8 ± 0.3 | 0.0001 | 40% |
| ACC mRNA abundance | | decreased | | |

Short chain fatty acids were also decreased in the milk fat containing high levels of trans fatty acids. This is consistent with the observed decreases in enzyme activities.

Milk Fat FA Sources
  Acetate and BHB* made in rumen are used in gland to make FA. tFA made in the rumen from diet fat.
  BHB=*Beta hydroxy butyrate
Mammary Gland
  Make all the short chain fatty acids 6→14.
  C-4(butric acid) comes from BHB
  C-16 (palmitic acid) comes from diet and synthesis
  Almost all the 18's come from diet
  All the 18:2, 18:3 come from diet
  tFA come from diet via biohydrogenation or as rumen protected supplements

INGREDIENT COMPOSITION OF BIOPSY DIET

| INGREDIENT | % of DM | |
|---|---|---|
| | CT | HC |
| Forage | 60 | 25 |
| Corn Silage | 45.2 | 25 |
| Alfalfa haylage | 14.8 | 0 |
| Concentrate | 40 | 75 |
| Ground corn | 22.8 | 52.2 |
| Soyplus | 1.6 | 0 |
| Soybean meal | 13.8 | 15.4 |
| Urea | 0 | 0.6 |
| Dicalcium Phosphate | 0.52 | 0.67 |
| Limestone | 0.32 | 0.9 |
| NaCl | 0.4 | 0.4 |
| KCl | 0.52 | 0 |
| MgO | 0.16 | 0.3 |
| Dynamate | 0.6 | 0 |
| Trace mineral & vitamin mix | 0.16 | 0.15 |
| Soy oil | 0 | 3.6 |

DIET:
Control (CT) = 36% corn silage; 24% alfalfa haylage; 40% concentrate.
Oil (HC) = 70% concentrate; 25% corn silage + 5% soybean oil.

CHEMICAL COMPOSITION OF BIOPSY DIETS

| INGREDIENT | % of DM | |
|---|---|---|
| | CT | HC |
| DM % | 55.2 | 74.8 |
| Crude Protein | 17.5 | 17.3 |
| UIP | 6.3 | 6.4 |
| Sol. Protein | 5.5 | 5.3 |
| ADF Fiber | 18.1 | 8.2 |
| NDF Fiber | 31.2 | 17.5 |

-continued

CHEMICAL COMPOSITION OF BIOPSY DIETS

| | % of DM | |
|---|---|---|
| INGREDIENT | CT | HC |
| NF CHO | 40.7 | 53.1 |
| Energy NE MCAL/lb | 0.73 | 0.89 |
| Fat | 3.0 | 7.2 |
| Calcium | 0.69 | 0.72 |
| Phosphorus | 0.44 | 0.43 |
| Sodium | 0.25 | 0.22 |
| Magnesium | 0.30 | 0.22 |
| Sulfur | 0.23 | 0.22 |
| Potassium | 1.3 | 1.11 |
| Chlorine | 0.44 | 0.60 |

Diet
Control (CT) = 36% corn silage; 24% alfalfa haylage; 40% concentrate
Oil (HC) = 70% concentrate; 25% corn silage + 5% soybean oil

MOUSE MILK FAT LEVELS WHEN FED DIFFERENT DIETS

| | Fat[1] as Volume % | | |
|---|---|---|---|
| DIET | CIS | TRANS | P< |
| High Fat High *EFA Fat (40 enl %) EFA (12 en %) tFA (0 or 10 en %) | 35 | 26 | $10^{-6}$ |
| Low Fat High EFA Fat (20 en %) EFA (6 en %) tFA (0 or 15 en %) | 36 | 27 | $10^{-6}$ |
| High Fat Low EFA Fat (20 en %) EFA (2 en %) tFA (0 or 7 en %) | 37 | 24 | $10^{-6}$ |
| Low Fat Low EFA Fat (20 en %) EFA (2 en %) tFA (0 or 7 en%) | 35 | 24 | $10^{-6}$ |

[1]Wt % = 0.06 ± 0.73 Vol %.
*EFA = Essential Fatty Acids

FATTY ACID COMPOSITION OF BIOPSY DIETS

| | % FAME | | % DM | |
|---|---|---|---|---|
| Fatty Acid | CT | HC | CT | HC |
| 16:0 | 17.1 | 14.4 | 0.5 | 1.03 |
| 18:0 | 3.0 | 3.2 | 0.9 | 0.23 |
| 18:1t | nd | nd | nd | nd |
| 18:1c | 16.2 | 19.5 | .49 | 1.40 |
| 18:2 | 45.6 | 53.7 | 1.4 | 3.9 |
| 18:3 | 4.4 | 3.4 | 0.1 | 0.24 |

EXAMPLE 6

As noted above, the prevailing view is that the ingestion of $C_{18:1}$ trans fatty acids leads to milk fat depression in a lactating animal. Thus ingestion of $C_{18:1}$ may be responsible for lactation failure in mammals including humans. However, it is now determined that $C_{18:1}$ t-11 trans fatty acid ingestion does not reduce milk fat in the lactation products of mammals.

C57/B1/6J mice fed a control diet (10 wt % fat) were switched to one of four isomer diets at day 6 of lactation after milk collection. Approximately 25% of the dietary fat (5 caloric %) during the treatment period was replaced with one of four specific isomers of oleic acid, either cis-9; cis-11; trans-9 or trans-11, other diet components were identical. The mice consumed these diets ad libitum for four days and were milked again on day 10 of lactation. Milk and fecal fatty acid composition was analyzed as fatty acid methyl esters by GC. Specific isomers were identified by relative retention times. Milk fat percentage was determined by the creamatocrit method and differences between day 6 and day 10 fat percentages were evaluated by a paired t-test.

Mice fed the trans-9 diet had statistically lower (PC 0.001) milk fat on day 10 than on day 6. Although day 10 milk fat for animals fed cis-11 and trans-11 diets was numerically lower, the result was not statistically different as compared to the control. Cis-9 fed animals had identical fat values on days 6 and 10 (P>0.8). Fatty acid consumptions of the milk fats confirmed the dietary treatments. Each of the test isomers appeared in the milk from mice fed the different diets. The cis-11 isomer was normally present at a level of 3% of the fat on day 6 when animals were fed control diet, and at 10% on day 10 when fed the cis-11 diet. Likewise, the trans isomers, normally present in milk at <0.1% of the fat were identified at 5.8% for trans-9 and 3% for trans-11 although the dietary level was 28% of diet fat. Fecal fat and fatty acid compositions change with diet changes and high levels of the trans isomer (~65%) indicated lack of absorption of these geometric isomers compared to their cis counterparts (30%).

The inventors have also learned that ingestion of $C_{18}$ trans 11 fats do not reduce milk fat levels in cows.

FATTY ACID COMPOSITION OF BIOPSY DIETS

| | % FAME | | % DM | |
|---|---|---|---|---|
| Fatty Acid | CT | HC | CT | HC |
| 16:0 | 17.1 | 14.4 | 0.5 | 1.03 |
| 18:0 | 3.0 | 3.2 | 0.9 | 0.23 |
| 18:1t | nd | nd | nd | nd |
| 18:1c | 16.2 | 19.5 | .49 | 1.40 |
| 18:2 | 45.6 | 53.7 | 1.4 | 3.9 |
| 18:3 | 4.4 | 3.4 | 0.1 | 0.24 |

Thus, $C_{18}$ trans 11, a CLA precursor may be used as a feed supplement for breast feeding.

EXAMPLE 5

In yet another example six cows were infused post rumen with vegetable oils formulated to have the same fatty acid composition of monounsaturates and polyunsaturates. Six other cows were given 18:1 trans as part of the mixture and another six cows were infused with only 18:1 cis. The milk fat composition of all eighteen cows was analyzed for selected fatty acids. As shown in table on page 66, post ruminal infusion of 18:1 trans results in milk fat reduction, and large increases in trans $C_{18:1}$ per 100 gram of milk fat.

The table in page 66 indicates that infusions of fat will slightly decrease $C_{10}$–$C_{16}$ fatty acids, but supplying trans enhances fat reduction in $C_{10}$-$C_{16}$ range. The results also indicate increased levels of 18:2 n-6 from the trans and cis infused cows.

MILK PARAMETERS OF COWS AFTER ABOMASAL
INFUSION WITH CIS OR TRANS FATS

| PARAMETER | TREATMENT | | | P< | |
|---|---|---|---|---|---|
| | Control | CIS | TRANS | Fat[1] | Isomer[1] |
| Number of cows | 6 | 6 | 6 | | |
| Milk, kg/d | 32 | 35 | 34 | 0.01 | ns |
| Fat % | 3.9 | 4.1 | 3.2 | 0.05 | 0.001 |
| 3.5% FCM, kg/d | 33.4 | 37.5 | 31.6 | ns | 0.001 |
| trans-$C_{18:1}$ g/100 g fat | 1.6 | 1.7 | 14.0 | 0.001 | 0.001 |

[1]Orthogonal contrasts: Fat = no infusion versus infusion of CIS and TRANS fat mixtures; and Isomer = infusion of cis versus trans fats.

FATTY ACID COMPOSITION OF MILK FAT FROM
COWS RECEIVING ABOMASAL INFUSIONS OF CIS
OR TRANS FAT MIXTURES

| SELECTED FATTY ACIDS | TREATMENT | | | P< | |
|---|---|---|---|---|---|
| | Control | CIS | TRANS | Fat[1] | Isomer[1] |
| 10:0 | 3.1 | 2.7 | 2.0 | ns | 0.001 |
| 12:0 | 5.3 | 3.9 | 2.9 | ns | 0.001 |
| 14:0 | 14.2 | 10.8 | 9.7 | 0.001 | 0.001 |
| 16:0 | 36.1 | 25.7 | 22.5 | 0.001 | 0.001 |
| 18:0 | 10.1 | 10.8 | 11.3 | ns | 0.01 |
| 18:1 trans | 1.6 | 1.7 | 14.0 | 0.001 | 0.001 |
| 18:1 cis | 18.5 | 33.3 | 24.1 | 0.001 | 0.001 |
| 18:2 n − 6 | 2.5 | 4.8 | 5.1 | 0.001 | 0.001 |
| odd chain (13 to 19) | 4.9 | 3.3 | 4.4 | 0.001 | 0.01 |

[1]Othogonal contrasts: Fat = no infusion versus infusion of CIS and TRANS fat mixtures; and Isomer = infusion of cis versus trans fats.

mammals without fear of lactation failure. (Lactation failure is defined as a mother abandoning breast feeding of her infant because the child remains hungry after breast feeding. The infant simply is not getting enough calories).

These results also suggest that a mouse, fed defined diets and milked to determine milk compositions produced from the diets can be used as a model to predict cows milk composition when fed like diets or diets leading to similar fats presented to the cows intestinal tract.

EXAMPLE 7

Mouse Milking

Shown in FIG. 3 is a device 10 used to milk a mouse. As shown, device 10 included a stoppered flask 11 connected through its arm 12 to a vacuum pump or aspirator. A glass tube 14 in fluid communication with the arm is inserted through stopper 16 and connected to hose 18 as shown. Hose 18 is approximately fifteen inches in length. A second component of the mouse milker includes a small closed cylinder 20 such as a pill dispenser obtained from a pharmacy and its cap 22. A single small diameter hole 24 (about 0.5 mm) is drilled into the wall of the cylinder. This hole is easily stopped by closing it with the tip of one's index finger.

Figure 3A:
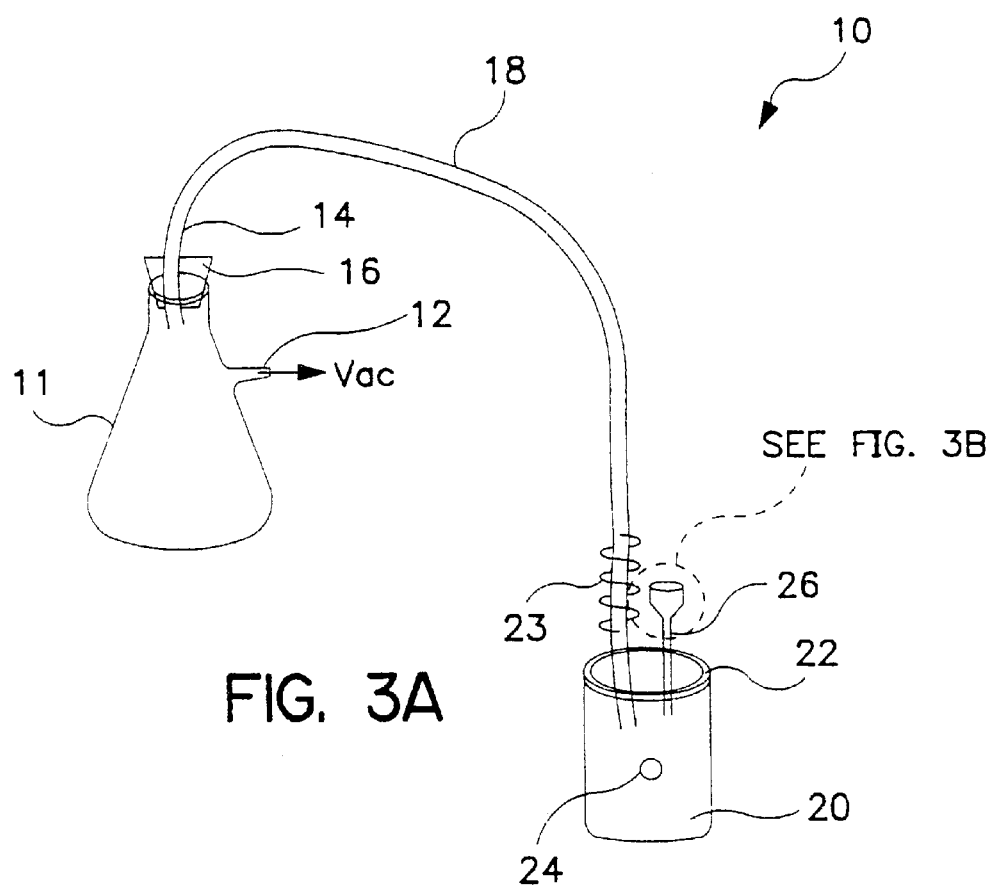
FIGS. 3a and 3b show a device used to milk mice.
Figure 3B:
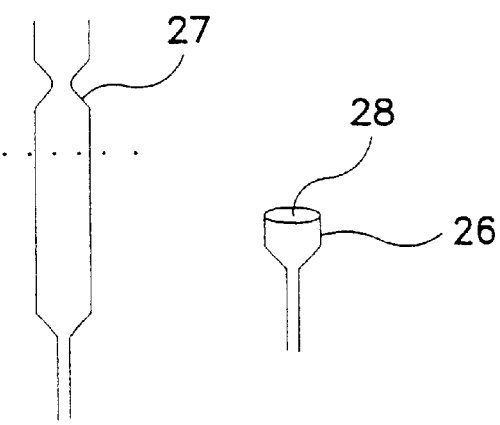

As shown in FIG. 3A, the second end of hose 18 is inserted through cap 22 of container 20. The end portion of hose 18 extending above the cap 22 is heavily taped with, for instance, surgical tape 23. This provides a "bullet" for the mouse to bite and prevents vacuum-line failure as the mouse cannot puncture hose 18.

A short glass tube 26, fashioned from a Pasture pipette 27 (inner diameter ¼ inch) is also inserted into the cap so that a first end extends into the hollow of the cap. The second end of the tube 26 is flame flared in the shape of a funnel (FIG. 3b) to receive a mouse teat.

A lactating mouse is milked after injection of oxytocin (0.2 ml of a 1 IU/ml solution) immediately prior to milking. Milking is accomplished by creating a suction through tube 26 and inserting the funnel end 28 or tube 26 onto the teat of a lactating mouse in the upside-down position. As milk is collected into the funnel, a small capillary tube (i.e. the same as that used to collect human blood samples) is manually positioned within the funnel to collect milk by capillary action. Failure to promptly collect the milk will expose the milk to evaporation thus increasing fat content of the sample.

Adjustments to the vacuum or amount of suction are made by lifting the index finger on and off of hole 24 on the cylinder. This on and off lifting of the finger also simulates the suckling pups and thus improves collection.

Although the invention is described with preferred embodiments, it is to be understood that variations and modifications may be used as will be appreciated by those of ordinary skill in the art. For instance, the invention includes feeding fats which contain tFA in the form of triglycerides, partial glycerides, free acids or as fatty acid derivatives such as salts, amides, esters, etc. These fatty acids or the substrate for the production of these fatty acids can be fed to various animals to produce the desired levels of CLA in the animal. Likewise human diets could be supplemented with the naturally occurring substrates or edible products of animals consuming CLA producing diets.

Mammary Lipogenic Enzyme Activity.

Mammary lipogenic enzyme activity, trans fatty acids and conjugated linoleic acids are altered in lactating dairy cows fed a milk fat depressing diet.

The abbreviations used in the disclosure below have the following meanings: ACC=acetyl-CoA carboxylase; FA=fatty acid; CLA=conjugated linoleic acids; DMI=dry matter intake; FABE=fatty acid butyl esters; FAME=fatty acid methyl esters; FAS=fatty acid synthase; MFD=milk fat depressing; mRNA=messenger RNA; PUFA=polyunsaturated fatty acids; tFA=trans-18:1 fatty acid isomers; TMR=total mixed ration.

The effect of a milk fat depressing (MFD) diet on: 1) the activity of mammary acetyl-CoA carboxylase (ACC) and fatty acid synthase (FAS); 2) ACC mRNA relative abundance; and 3) distributions of conjugated linoleic acids (CLA) and trans 18:1 fatty acids (tFA) in milk fat was studied. Twelve lactating Holstein cows were used in a single reversal design. Two diets were fed: a Control diet (60% forage:40% concentrate); and a MFD diet (25% forage:70% concentrate, supplemented with 5% soybean oil). The MFD diet decreased (P<0.001) milk fat by 43% and ACC and FAS activity by 61% and 44%, respectively. A reduced ACC mRNA relative abundance (P<0.001) corresponded with the lower ACC activity. The fatty acids synthesized de novo were decreased (P<0.002), while tFA were increased from 1.9% to 15.6% due predominately to a change in trans-10-18:1 isomer (P<0.001). Trans-7, cis-9 and trans-10, cis-12 CLA isomers were elevated (P<0.001), in contrast to the decrease in trans-11-18:1 (P<0.001) and cis-9, trans-11-18:2 due to the MFD diet. The data were consistent with a dietary effect on mammary de novo FA synthesis mediated through a reduction in ACC and FAS activity and ACC mRNA abundance. The results were compatible with a role of trans-10, cis-12 CLA in milk fat depression, but alterations noted in tFA and other CLA isomers suggest that they also may be important, during dietary induced milk fat depression.

The following studies were made to determine the effect of a MFD diet on the activities of ACC and FAS and relative abundance of ACC mRNA in cow mammary gland, and to examine the milk CLA and trans-18:1 isomer profiles during milk fat depression.

Animals and Diets.

All procedures for this study were carried out under Protocol R-95-33 A approved by the University of Maryland Animal Care and Use Committee. Twelve lactating Holstein cows (84±13 days postpartum) were used. The Control diet had a forage to concentrate ratio of 60:40 and was formulated to meet the NRC requirements for milk production at 40 kg/d and 3.5% milk fat. Cows were fed the Control diet during the two week preliminary period and randomly assigned to either the Control or a MFD diet containing 25% forage, 70% concentrate, supplemented with 5% soybean oil (Wesson, Vegetable oil, Ingredient: Soybean oil). Diets were fed in a single reversal design using 3 wk experimental periods.

Ingredients and chemical composition of the diets are presented in Table A. Forage and concentrate dry matter (DM) were determined weekly and the total mixed ration (TMR) was adjusted accordingly to maintain a constant forage to concentrate ratio on DM basis during the experiment. Cows were housed in tie stalls, bedded with wood shavings, except when they were turned out to be milked in a milking parlor at 0200 h and 1400 h. Diets were fed as TMR once daily at 0800 h. Feed refusals were recorded once daily at 0600 h.

Milk Sample Collection and Analyses.

Milk production was recorded daily and milk samples were collected for six consecutive milkings at the end of each experimental period. Milk fat, protein, and SCC were analyzed using infrared analysis (Foss Milkoscan, Foss Food Technology Corp., Eden Pairie, Minn.). Fatty acid composition of milk fat was determined as described below.

Total Fatty Acid Pattern.

Fatty acid methyl esters (FAME) were prepared by a direct transesterification method employing anhydrous methanolic HCl (Gaynor et al. 1995). Resulting FAME were separated and quantified using a 30 m×0.25 mm fused silica capillary column coated with SP-2380 (Supelco Inc., Bellefonte, Pa.), essentially as described by Wong et al. (1993). A variety of FAME standard mixtures, including GLC-60, (Nu Check Prep; Elysian, Minn.) were used to help identify components and assist in calculation of response factors. Correction factors for total trans-18:1 values were obtained as described previously (Atal et al. 1994, Sampugna et al. 1982).

Short and medium chain fatty acids were analyzed as butyl esters (FABE) which were mathematically converted to FAME and normalized to the FAME chromatogram (Gander et al. 1962). The original FABE procedure was modified as follows. Milk samples (200 $\mu$L), in screw capped test tubes, were heated at 100° C. for 1 h in the presence of 1 mL of butanol and 200 $\mu$L of acetyl chloride. Aliquots of the upper layer were analyzed using a Hewlett-Packard 5880 GLC (Avondale, Pa.) equipped with a split injector, a flame ionization detector and a 25 m×0.2 mm fused silica capillary column coated with HP1 (Hewlett Packard; Avondale, Pa.). Helium was used as the carrier gas at a flow rate of 2 mL/min with a split ratio of 45:1. After 5 min at 90° C., the column temperature was raised (4° C./min) to 106° C. and at 10 minutes, programmed at 5° C./min to a final temperature of 250° C. Standard mixtures, including GLC-60, were converted to FABE to aid in the identification and quantification of components.

Trans-18:1 Isomer Distribution.

Butyl esters, prepared as described above, were separated by preparative $Ag^+$-TLC to obtain a trans monoene fraction (Sampugna et al. 1982) using FABE standards of 14:0, cis-9-18:1, and trans-9-18:1to help locate fractions of interest. A GLC system similar to that previously described (Wong et al. 1993) was used to separate isomers, except that a 100 m×0.25 mm fused silica capillary column (SP-2560, Supelco Inc, Bellefonte, Pa.) at a column temperature of 173° C., a split ratio of 100:1, and nitrogen as make-up gas (25 mL/min) were employed. Isomers of cis and trans fatty acids with double bonds in the 6, 7, 9, 11, 12, 13, and 15 position, (Sigma Chemical Co, St Louis, Mo.), as well as a sample of trans-10-18:1, and cis and trans-18:1 fractions isolated from a shortening sample (Sampugna et al. 1982) were converted to FABE to assist in the identification and quantification of the trans-18:1 isomers.

Conjugated Fatty Acids.

The milk fat was extracted using a modified Folch procedure (Christie 1982). Fatty acid methyl esters were prepared as described by Sehat et al. (1998a), and were analyzed using GLC and $Ag^+$-HPLC to obtain estimates of total CLA and to determine isomer distribution patterns. The GLC system, described previously (Eulitz et al. 1999), utilized a fused silica capillary column (CP-Sil 88; 100 m×0.25 mm i.d.×0.2 mm film thickness; Chrompack Inc.) which was held at 70° C. for 4 min after injection, temperature programmed (13° C./min) to 175° C., held at 175° C. for 27 min, then temperature programmed (4° C./min) to 215° C., and maintained at 215° C. for 31 min. Hydrogen was used as the carrier gas, at a split ratio of 20:1. The detector and injector were set at 250° C.

Argentation-HPLC separation (Sehat et al. 1998b) of CLA methyl esters was carried out using an HPLC (Waters 510 solvent delivery system; Waters Associates, Milford, Mass.), equipped with a 100 $\mu$L injection loop (Waters 600E, System Controller), a photodiode array detector (Waters 996) operated at 233 nm, and a Waters software program (Millennium™ version 2.15). Three ChromSpher 5 Lipids analytical silver impregnated columns (each 4.6 mm i.d.× 250 mm stainless steel; 5 $\mu$m particle size; Chrompack, Bridgewater, N.J.) were used in series. The mobile phase was 0.1% acetonitrile in hexane and operated isocratically at a flow rate of 1.0 mL/min. The column head pressure was 1050 psi for the 3 columns in series. The flow was commenced for 0.5 h prior to sample injection. Typical injection volumes were 5–15 $\mu$L, representing ca 40–120 $\mu$g FAME. Details on the identification and quantification of the CLA isomers have been described elsewhere (Eulitz et al. 1999, Sehat et al. 1998a, and 1998b).

Biopsy Procedure.

Mammary tissue biopsy was performed (Farr et al. 1996) on 10 cows during the third week of each experimental period to obtain a core sample of 0.7–0.8 g. For the first 3 to 4 milkings after biopsy, care was taken to milk the cows thoroughly by hand to remove any blood clots lodged in the gland.

Enzyme Analysis.

Following the biopsy procedure, tissue samples were homogenized as described by Mellenberger et al. (1973). The enzyme activities were assayed in the cytosolic fraction (105,000×g), at 37° C. in the linear range of activity. Acetyl-CoA carboxylase (EC 6.4.1.2) activity was determined using the $^{14}C$-labeled bicarbonate fixation method (Mellenberger et al. 1973) and expressed as nmoles of bicarbonate incorporated into acid-stable products per min per mg of cytosolic protein. Fatty acid synthase activity was determined spectrophotometrically (Hardie et al. 1981) by measuring malonyl-CoA dependent oxidation of NADPH at 37° C. and expressed as nmol of NADPH oxidized per minute per mg of cytosolic protein. Protein concentrations were measured by the Bicinchoninic acid (BCA) procedure (Pierce, Chemical Co., Rockford, Ill.), using bovine serum albumin as the standard.

Northern Blot Analysis of Total RNA.

Immediately after biopsy the mammary tissue (250 mg) was homogenized in 2.5 volumes of ice cold denaturing solution (4 mol/L guanidinium thiocyanate, 25 nmol/L sodium citrate, pH 7, 0.5% sarcosyl, 0.1 mol/L 2-mercaptoethanol) and kept at −80° C. until analyzed. The total RNA was isolated as described by Chomczynski and Sacchi (1987) and assessed for purity prior to use. Concentrations were determined spectrophotometrically at A260 nm. Only samples with A260/A280 ratios greater than 1.80 were used for analysis. The RNA integrity was confirmed visually on a 1% agarose-formaldehyde mini gel. Total RNA (50 $\mu$g), separated as described by Sambrook et al. (1989) was transferred overnight to a positively charged nylon membrane (Hybond-N+, Amersham, UK) by capillary action. The RNA was cross-linked to the membrane (40 sec at 1200 $\mu$Joules×100)in a UV Stratalinker 1800 (Stratagene, La Jolla, Calif., U.S.A.). The acetyl-CoA carboxylase cDNA (730 bp) was amplified from pig adipose tissue RNA and the sequence corresponding to nucleotides 642–1370 of the rat ACC cDNA (Lopez-Casillas et al. 1988) was confirmed by Liu (1992). The membrane was prehybridized (5–6 h) and hybridized (16–18 h with 2.45–2.95×10$^6$ dpm/mL [$\alpha$-$^{32}$P] dCTP labeled ACC cDNA) in a solution consisting of: 50% formamide, 50 mmol/L NaH$_2$PO$_4$ pH 6.5, 5 mmol/L EDTA pH 7.4, 25% 20×SSC, pH 7.0, 5×Denhardts, 10% sodium dodecyl sulfate and 200 $\mu$g denatured salmon sperm DNA, except that the hybridization solution contained 1×Denhardts. Subsequently, the membrane was stripped in 0.5% (w/v)SDS at 100° C. for 1 h and rehybridized with 25 ng of bovine ribosomal protein S4 (Acc# U31305, 638 bp) cDNA (kindly provided by Dr. S. L. Ogg, University of Maryland, College Park, Md.) to correct for sample loading and transfer variation during Northern blotting.

Autoradiograms were obtained by exposure of membranes to Kodak XAR-5 film for 7 days at −80° C. A single band of approximately 9.5 kb for ACC mRNA was visible, and the size was verified by a RNA marker ladder (0.24–9.5 kb; Sigma Chemical, St Louis, Mo.). Autoradiograms were scanned twice and analyzed using ImageQuant software (Molecular Dynamics Inc., Sunnyvale, Calif.). The bovine ribosomal protein S4 mRNA was detected by exposure to Kodak XAR-5 film for 6 h, at −80° C. Values were normalized across samples using bovine ribosomal protein S4 mRNA. The results are presented as the relative abundance of ACC mRNA in densitometric units.

Statistical Analysis.

Statistical analysis were conducted using the General Linear Models Procedure in the Statistical Analysis System (Version 6.12, 1998, SAS Institute, Cary, N.C.). The statistical model included the effect of cow, experimental period and treatment. Probabilities of (P<0.05) were considered to be statistically significant. All data are reported as least squares means.

Animal Health.

The repeated biopsies caused minimal animal discomfort. The mammary glands healed without infection, showed no evidence of clinical mastitis, and there were no long term adverse effects on milk production and composition.

Milk Production and Composition.

Dietary treatment did not affect either (DMI) or daily milk production (Table B). Milk protein was increased by 0.34 percentage (P<0.003) units resulting in higher milk protein production (P<0.002) when the cows were fed the MFD diet. The milk fat percent and yield were reduced by 43% (P<0.001), and the fat-corrected milk yield was decreased by 18% (P<0.002) compared to the Control group.

Milk fat of cows receiving the MFD diet contained 62% less total saturated fatty acids (P<0.001), than that of Controls (Table C). The relative proportion of short and medium chain fatty acids (6:0 to 14:0), was decreased by 27% (P<0.002) and the amount (g/day) in milk was reduced by 60% (P<0.001). Palmitic acid, which partially derives from de novo synthesis in the mammary gland, was decreased by 32% (P<0.001). While the percentage of stearic acid and cis-18:1 was not affected by the MFD treatment, their daily yield in milk was significantly reduced (P<0.001) The percentage of linoleic acid (18:2 n-6) and linoleic acid isomers (18:2i), some of which also contain one or two trans double bonds were higher (P<0.001)in the milk fat of cows fed the MFD diet. The daily amounts (g/day) of 18:2 and 18:2i secreted in the milk, were not significantly different from the Controls. Due to the dietary change milk tFA percent was increased from 1.9% to 15.6% (P<0.001) and the amount of tFA secreted daily in milk was 16.9 grams in the Control versus 75.6 grams in the cows that received the MFD diet.

The major component in the trans-18:1 FA fraction of milk from cows fed the Control diet was the trans-11 isomer (Table D). However, sizable amounts of trans-13+14, as well as trans-10 and trans-12 isomers were found (Table D). In contrast, the trans-10-18:1 was the predominant isomer in the milk fat of the cows fed the MFD diet, representing about 60% of the total trans-18:1 FA. Except for the trans-6+7+8 and trans-9, the concentration of all other trans-18:1 components was reduced (P<0.001), compared to the Control cows. The amounts of most of the individual trans isomers secreted in the milk fat (g/day) were higher with the MFD diet. The yields of trans-15 and trans-16 isomers were least affected by the diet.

The total CLA content (Table E) measured in the milk fat of the control cows was similar to data reported by others (Dhiman et al. 1999) The percent of CLA in milk of cows fed the MFD diet changed from 5.6 mg/g fat to 9.5 mg/g fat (P<0.001), while the yield of total CLA (g/day) was not different due to the marked decrease in milk fat production. The major CLA isomers in the milk of the Control cows were cis-9, trans-11, and trans-7, cis-9. The individual CLA isomer profile was altered by the MFD diet. Although, the predominant isomer was still cis-9, trans-11 CLA, the percentage was decreased from 79.7% to 56.7% (P<0.001) of the total CLA. A ten fold increase in the trans-10, cis-12 (P<0.001) CLA and a significantly greater proportion of trans-7, cis-9 CLA (P<0.001) was found in milk from cows fed the MFD diet. The cis-8, trans-10 isomer was less than 2% of the total CLA and was not affected by diet.

Enzyme Activity and ACC mRNA Abundance.

The ACC activity in the cows fed the Control diet averaged 9.8 nmol/(min·mg protein) and FAS activity was 13.2 nmol oxidized NADPH (min·mg protein) (Table F). These activities were similar to results reported in other studies (Akers et al. 1981, Mellenberger et al. 1973) for lactating bovine mammary tissue. Acetyl-CoA carboxylase and FAS activities were reduced by the MFD diet and the effect was more pronounced for the ACC activity, which was inhibited by 62% (P<0.001) compared to a 44% (P<0.001) decrease in FAS activity. A parallel decrease (P<0.001) in the mammary ACC mRNA relative abundance was observed, in cows fed the MFD diet (Table F) and the depression of both ACC activity and ACC mRNA relative abundance was of similar magnitude.

A high concentrate diet supplemented with soybean oil, was used in this study to provide PUFA for rumen biohydrogenation and a high amount of carbohydrate to lower rumen pH (Kalscheur et al. 1997a, Kennelly et al. 1999, Van Nevel and Demeyer 1996). These conditions lead to changes in rumen environment, incomplete biohydrogenation of PUFA, and milk fat depression (Griinari et al. 1998, Harfoot and Hazlewood 1988, Kalscheur et al. 1997a).

Reduced milk fat and increased tFA were observed in the cows fed the MFD diet in this study. When we examined the isomer distributions of milk CLA and tFA, specific changes were observed in cows fed the MFD diet. Based on the changes in the isomer profiles, we postulate that isomerization of PUFA to conjugated dienes and conversion of CLA to trans monoenes in the rumen was affected by the diet.

Analysis of the CLA showed a decrease in the major cis-9, trans-11 isomer and an increase in trans-10, cis-12 and trans-7, cis-9 CLA, in cows fed the MFD diet. Trans-10-18:1 was the predominant trans monoene in the milk fat during milk fat depression compared to a preponderance of the trans-11-18:1 in the Control cows. The changes in the cis-9, trans-11 CLA and trans-11-18:1 isomers were in agreement with the positive correlation found between these isomers in cows milk (Jiang et al. 1996). The reduction observed in cows fed the MFD diet showed that it is unlikely that these isomers are involved in reducing milk fat. Data from studies with lactating mice fed trans-11-18:1 (unpublished data) and abomasal infusion of cis-9, trans-11 CLA in lactating cows (Baumgard et al. 2000) are consistent with the lack of an effect of these isomers on milk fat depression.

Three and 10 fold increases, respectively, in tFA and CLA isomers containing a trans-10 double bond were found in the milk fat of cows fed the MFD diet. The trans-10, cis-12 CLA, is probably produced in the rumen by the action of a specific isomerase, and further hydrogenated to trans-10 18:1 (Griinari & Bauman 1999). The presence of trans-10, cis-12 18:2 has been reported or tentatively identified in studies in vitro with rumen fluid (Fellner et al. 1997) and in rumen and milk samples from cows (Griinari et al. 1997, and 1999a). Based on infusion studies with CLA isomers Baumgard et al. (2000) concluded that the trans 10, cis-12 CLA isomer is responsible for milk fat depression and our findings are consistent with this hypothesis. Nevertheless, the observation of milk fat depression, during infusion of a CLA mixture containing the cis-8, trans-10, isomer (Chouinard et al. 1999a), suggests that other CLA isomers may also be involved. Although we did not observe an increase in cis-8, trans-10 isomer (Table 5), we did find a significant increase in the trans-7, cis-9 CLA in the milk of cows fed the MFD diet. However, its importance in eliciting milk fat depression is unclear.

The identity of trans-7, cis-9 CLA has been elucidated by Yurawecz et al. (1998) and it has been described as the most abundant minor CLA in cow and human milk. Formation of this isomer by the action of $\Delta^9$-desaturase on trans-7-18:1 has been reported to occur in microsomal preparations of rat liver (Pollard et al. 1980) and Corl et al. (1998) have shown that cow mammary gland can synthesize cis-9, trans-11 CLA from trans-11-18:1. Thus it is possible that trans-7, cis-9 CLA could originate from $\Delta^9$-desaturation of trans-7-18:1 in mammary tissue. Further studies are required to determine if this isomer is produced in the rumen.

Based on the FA composition (Table 3) in milk of cows fed the MFD diet, the decrease in milk fat content was mostly related to a reduction in FA synthesized de novo in mammary tissue. Lower yields of these FA were consistent with observations of reduced ACC and FAS activity and ACC mRNA relative abundance. From the changes in ACC mRNA relative abundance it is likely that the reduction in enzyme activities is due to a decreased content of these enzymes in the milk fat depressed state.

It is well known that PUFA can suppress lipogenic gene expression (Clarke and Jump 1999, Jump et al. 1994). Although, some dietary PUFA escapes rumen biohydrogenation, we do not believe that PUFA were directly involved in milk fat depression in this work. In previous studies (Gaynor et al. 1994, Romo et al. 1996) in lactating cows post-ruminally infused with identical amounts of PUFA, we only observed a reduction in milk fat when the infusion mixture contained trans-fatty acids. Loor and Herbein (1998) have reported that compared to abomasal infusion of linoleic acid alone, CLA was required before milk fat depression was demonstrated. Additionally, when cows were fed diets supplemented with oils rich in PUFA (Kalscheur 1997b) milk fat depression was not observed, and when cows were fed identical levels of dietary PUFA, milk fat was reduced only when rumen pH was lowered (Kalscheur et al. 1997a). These studies force one to conclude that dietary PUFA, per se, are not sufficient to induce milk fat depression and that alterations in the rumen environment are also required. Such alterations were undoubtedly responsible for the increased levels of specific isomers observed in the present study, and we believe that one or more of these isomers is involved in milk fat depression.

In summary, feeding a MFD diet to lactating cows, decreased de novo FA synthesis in the mammary gland. Changes in mammary ACC mRNA relative abundance were consistent with decreased de novo FA synthesis, indicating that the mechanism of milk fat depression may involve, at least partly, the regulation of gene expression of lipogenic enzymes. The alterations in the CLA and trans-18:1 isomer patterns was an indication of specific modifications in the rumen environment induced by the MFD diet. The results were in agreement with an effect of the trans-10, cis-12-CLA on milk fat depression, but the changes observed in other tFA and CLA isomers may also be important.

TABLE A

Ingredients and chemical composition of the total mixed ration Diet

| | g/100 g of DM[2] | |
|---|---|---|
| | Control | MFD[1] |
| Ingredient | | |
| Corn silage | 45.2 | 25.0 |
| Alfalfa Haylage | 14.8 | 0.0 |
| Ground Corn | 22.8 | 52.2 |
| Soybean meal | 13.8 | 15.4 |
| Soybean oil | 0.0 | 5.0 |
| Soyplus[3] | 1.6 | 0.0 |
| Urea | 0.0 | 0.6 |
| Dicalcium Phosphate | 0.5 | 0.7 |
| Limestone | 0.3 | 0.9 |
| NaCl | 0.4 | 0.4 |
| Potassium-Magnesium Sulfate[4] | 0.6 | 0.0 |
| KCL | 0.5 | 0.0 |
| Trace minerals & Vitamins[5] | 0.2 | 0.2 |
| MgO | 0.2 | 0.3 |

TABLE A-continued

Ingredients and chemical composition of the total mixed ration Diet

|  | g/100 g of DM[2] | |
|---|---|---|
|  | Control | MFD[1] |
| Chemical Composition | | |
| Crude Protein | 17.5 | 17.3 |
| UIP[6] | 6.3 | 6.4 |
| Acid Detergent | 18.1 | 8.2 |
| Neutral Detergent Fiber | 31.2 | 17.5 |
| Non-Fiber Carbohydrate | 40.7 | 53.1 |
| Net Energy for Lactation | | |
| Mcal/kg | 0.7 | 0.9 |
| Fat | 3.0 | 7.2 |
| Calcium | 0.75 | 0.75 |
| Phosphorus | 0.37 | 0.37 |
| Sodium | 0.31 | 0.22 |
| Magnesium | 0.30 | 0.21 |
| Sulfur | 0.15 | 0.15 |
| Potassium | 1.32 | 1.15 |
| Chlorine | 0.41 | 0.61 |

[1]Milk fat depressing diet.
[2]Dry Matter.
[3]Soyplus/West Central (Ralston, IA).
[4]Pitman-Moore, Inc. (Chicago, IL); guaranteed analysis: 22% S, 18% K, and 11% Mg.
[5]Combined 549 g/kg calcium carbonate and 451 g/kg of trace mineral and vitamin mix. Trace mineral and vitamin mix combined (per kg mix) 24 g Mn, 24 g Zn, 6.5 g Cu, 0.29 g I, 0.048 g Co, 0.144 g Se, 0.95 g retinyl acetate, 0.018 g cholecalciferol, and 12.67 g dl-α-tocopheryl acetate.
[6]Undegraded Intake Protein.

TABLE B

Dry matter intake, milk production and milk composition of cows fed Control, or milk fat depressing (MFD) diet[1]

| Item | Control | MFD | SED[2] | P<[3] |
|---|---|---|---|---|
|  | kg/d | | | |
| DMI[4] | 20.4 | 19.7 | 0.21 | 0.090 |
| Milk | 27.6 | 27.6 | 0.98 | 0.987 |
| 3.5% FCM[5] | 28.6 | 23.4 | 0.98 | 0.002 |
| Milk components | g/100 g | | | |
| Fat | 3.28 | 1.88 | 0.09 | 0.001 |
| Protein | 3.24 | 3.58 | 0.06 | 0.003 |
| Milk Production | g/d | | | |
| Fat | 945 | 536 | 36.8 | 0.001 |
| Protein | 930 | 1,055 | 52.8 | 0.002 |
| SCC/L[6] | 2098 | 1986 | 722 | 0.914 |

[1]Values are least square means, n = 10.
[2]Standard error of the difference.
[3]Probability that treatments are not different.
[4]Dry matter intake.
[5]Energy corrected yield corresponding to milk containing 3.5% fat.
[6]Somatic cell count.

TABLE C

Milk fatty acid composition of cows fed Control or milk fat depressing (MFD) diet[1]

| Fatty Acid | | Control | MFD | SED[2] | P<[3] |
|---|---|---|---|---|---|
|  | | g/100 g FAME | | | |
| 4:0 | ... | 3.8 | 3.2 | 0.17 | 0.051 |
| 6:0 | ... | 2.3 | 1.4 | 0.08 | 0.001 |
| 8:0 | ... | 1.6 | 0.9 | 0.14 | 0.002 |
| 10:0 | ... | 3.5 | 2.4 | 0.15 | 0.001 |
| 12:0 | ... | 4.2 | 3.2 | 0.18 | 0.002 |
| 14:0 | ... | 12.0 | 9.3 | 0.40 | 0.001 |
| 14:1 | ... | 1.0 | 1.0 | 0.09 | 0.884 |
| 16:0 | ... | 30.7 | 21.3 | 0.59 | 0.001 |
| 16:1 | ... | 2.1 | 1.9 | 0.09 | 0.235 |
| 18:0 | ... | 9.7 | 8.8 | 0.56 | 0.238 |
| Trans-18:1 | ... | 1.9 | 15.6 | 0.81 | 0.001 |
| cis-18:1 | ... | 19.7 | 19.3 | 0.63 | 0.607 |
| 18:2 (n − 6) | ... | 3.1 | 6.3 | 0.39 | 0.001 |
| 18:2i[4] | ... | 0.9 | 1.5 | 0.08 | 0.001 |
| 18:3 | ... | 0.6 | 0.5 | 0.04 | 0.251 |
| Total PUFA[5] | ... | 4.5 | 8.3 | 0.49 | 0.001 |
| Total SFA[6] | ... | 68.1 | 50.4 | 1.46 | 0.001 |
| Total de novo FA | ... | 39.2 | 27.7 | 1.03 | 0.002 |
| Total LCFA[7] | ... | 68.7 | 75.2 | 1.48 | 0.010 |
|  | | g/day | | | |
| 4:0 | ... | 34.8 | 16.3 | 1.61 | 0.001 |
| 6:0 | ... | 21.4 | 7.3 | 0.92 | 0.001 |
| 8:0 | ... | 15.6 | 4.9 | 1.40 | 0.001 |
| 10:0 | ... | 34.0 | 12.5 | 1.51 | 0.001 |
| 12:0 | ... | 40.5 | 16.7 | 1.71 | 0.001 |
| 14:0 | ... | 112.2 | 48.5 | 3.90 | 0.001 |
| 14:1 | ... | 8.6 | 5.1 | 0.92 | 0.023 |
| 16:0 | ... | 279.8 | 107.7 | 9.95 | 0.001 |
| 16:1 | ... | 18.2 | 9.5 | 0.95 | 0.001 |
| 18:0 | ... | 88.0 | 44.4 | 5.42 | 0.001 |
| Trans-18:1 | ... | 16.9 | 75.6 | 6.04 | 0.001 |
| cis-18:1 | ... | 170.1 | 95.7 | 1.18 | 0.001 |
| 18:2 (n − 6) | ... | 26.5 | 31.1 | 1.90 | 0.126 |
| 18:2i[4] | ... | 7.2 | 7.4 | 0.05 | 0.724 |
| 18:3 | ... | 5.1 | 2.5 | 0.30 | 0.001 |
| Total PUFA[5] | ... | 38.8 | 41.0 | 9.40 | 0.864 |
| Total SFA[6] | ... | 626.4 | 242.0 | 22.65 | 0.001 |
| Total de novo FA | ... | 223.8 | 89.9 | 12.03 | 0.001 |
| Total LCFA[7] | ... | 611.8 | 373.9 | 21.00 | 0.001 |

[1]Values are least square means n = 10; Other FA, including odd and branch chain, represented less than 3% of the total FAME are not included.
[2]Standard error of the difference.
[3]Probability that treatments are not different.
[4]Conjugated and non-conjugated
[5]Total polyunsaturated fatty acids.
[6]Total saturated fatty acids.
[7]Long Chain Fatty acids (16 carbon and greater).

TABLE D

Trans-18:1 content and isomer distribution in milk fat of cows fed Control or milk fat depressing (MFD) diet[1]

|  | Control | MFD | SED | P< |
|---|---|---|---|---|
|  | g/100 g FAME | | | |
| Total trans 18:1 | 1.9 | 15.6 | 0.81 | 0.001 |
| Double bond position | % of total trans 18: 1 | | | |
| 6 + 7 + 8 | 2.6 | 6.9 | 0.7 | 0.002 |
| 9 | 5.5 | 6.1 | 0.7 | NS[2] |
| 10 | 13.9 | 59.2 | 1.7 | 0.001 |
| 11 | 28.5 | 10.9 | 0.8 | 0.001 |
| 12 | 12.2 | 4.3 | 0.6 | 0.001 |
| 13 + 14 | 22.6 | 8.6 | 0.9 | 0.001 |
| 15 | 7.1 | 2.2 | 0.3 | 0.001 |
| 16 | 7.4 | 1.4 | 0.6 | 0.001 |
|  | g/day | | | |
| 16 + 7 + 8 | 0.5 | 6.1 | 0.9 | 0.002 |
| 9 | 1.0 | 5.4 | 0.9 | 0.001 |
| 10 | 2.5 | 50.0 | 0.6 | 0.001 |

TABLE D-continued

Trans-18:1 content and isomer distribution in milk fat of cows fed Control or milk fat depressing (MFD) diet[1]

|         | Control | MFD | SED | P<    |
|---------|---------|-----|-----|-------|
| 11      | 5.1     | 8.4 | 0.8 | 0.001 |
| 12      | 2.2     | 3.1 | 0.2 | 0.02  |
| 13 + 14 | 4.0     | 7.2 | 0.7 | 0.01  |
| 15      | 1.3     | 1.6 | 0.9 | NS    |
| 16      | 1.3     | 1.0 | 0.6 | NS    |

[1]Values are least square means, n = 10.
[2]NS, P $\geq$ 0.05.

TABLE E

Conjugated linoleic acids (CLA) content and isomer distribution in milk fat of lactating cows fed Control or milk fat depressing (MFD) diet[1]

|             | Control | MFD  | SED   | P<    |
|-------------|---------|------|-------|-------|
|             | g/100 g FAME | | | |
| Total CLA   | 0.56    | 0.95 | 0.11  | 0.001 |
| CLA isomers | g/100 g of total CLA | | | |
| t-7, c-9    | 7.8     | 23.4 | 1.66  | 0.001 |
| c-8, t-10   | 1.5     | 1.8  | 0.06  | 0.01  |
| c-9, t-11   | 79.7    | 56.7 | 1.23  | 0.001 |
| t-10, c-12  | 1.0     | 10.1 | 0.49  | 0.001 |
| c-11, t-13  | 0.2     | 0.1  | 0.05  | NS[2] |
| t-11, c-13  | 0.7     | 0.2  | 0.05  | 0.001 |
| c-12, t-14  | 0.7     | 0.7  | 0.19  | NS    |
|             | g/day   | | | |
| Total CLA   | 5.1     | 4.5  | 1.13  | NS    |
| t-7, c-9    | 0.4     | 1.1  | 0.04  | 0.001 |
| c-8, t-10   | 0.1     | 0.1  | 0.01  | NS    |
| c-9, t-11   | 4.1     | 2.6  | 0.36  | 0.01  |
| t-10, c-12  | 0.05    | 0.5  | 0.04  | 0.001 |
| c-11, t-13  | 0.01    | 0.004| 0.001 | 0.03  |
| t-11, c-13  | 0.04    | 0.01 | 0.004 | 0.001 |
| c-12, t-14  | 0.04    | 0.03 | 0.005 | NS    |

[1]Values are least square means, n = 10; trans/trans and cis/cis isomers are not included.
[2]NS, P $\geq$ 0.05.

Two experiments were conducted using abomasal infusion of a CLA mixture in lactating cows to determine: 1) the length of time after cessation of CLA infusion for the milk fat to return to control levels; and 2) to examine the dose response of milk fat to increasing rates of abomasal CLA infusion.

In Experiment 1, five rumen fistulated multiparous Holstein cows in mid lactation, were post-ruminally infused with 90 g per day of a commercial CLA mixture for five days followed by a 12 day post-infusion period. Six non-fistulated cows were maintained as controls during the experiment. Milk fat was reduced by 45% (2.13 in CLA vs. 3.89 in controls, P<0.0001) in the CLA infused cows at the end of the second day of infusion, and did not return to the control levels until day 6 post infusion. These results suggest a substantial carryover effect of CLA on milk fat synthesis.

In Experiment 2, four rumen fistulated cows were abomasally infused with 0, 10, 30 or 90 g/day of CLA mixture for 5 days in a 4×5 Latin rectangle design. Milk fat percent decreased linearly with increasing amount of CLA infused (P<0.03). Milk production was not changed by CLA infusion. Maximum rates of milk fat depression occurred with as little as 30 g of CLA mixture infusion confirming the potent effect of CLA on fat synthesis.

As shown above, feed compositions for ruminant production animals which contain sufficient amounts of conjugated linoleic acid, conjugated linolenic acid and monoenic fatty acids will be effective in reducing the percentage of fat in the milk produced by these animals. Preferred amounts of 0.2 wt % and above, based on the total weight of dry matter, for the conjugated linoleic acids and conjugated linolenic acids and 0.5 wt % and above, based on the total weight of dry matter, for the monoenic fatty acids. When added to the feed composition, the conjugated linoleic acids, conjugated linolenic acids and the monoenoic fatty acids are preferably a predominant component of the additive introduced to the feed, i.e., they have been isolated from other fatty acids or cis/trans isomers thereof.

Examples of suitable conjugated linoleic acids and conjugated linolenic acids are 18:2 isomeric CLA and 18:3 CLnA. Specific examples are 18:2 n-6 CLA, 18:3 n-3 CLnA and 18:3 n-6 CLnA. Examples of monoenoic fatty acids and other conjugated fatty acids are trans-5 18:1 fatty acid,
trans-6 18:1 fatty acid,
trans-7 18:1 fatty acid,
trans-8 18:1 fatty acid,
trans-9 18:1 fatty acid,
trans-10 18:1 fatty acid,
trans-11 18:1 fatty acid,
trans-12 18:1 fatty acid,
trans-13 18:1 fatty acid,
trans-14 18:1 fatty acid,
trans-15 18:1 fatty acid,
trans-16 18:1 fatty acid,
cis-5 18:1 fatty acid,
cis-6 18:1 fatty acid,
cis-7 18:1 fatty acid,
cis-8 18:1 fatty acid,
cis-9 18:1 fatty acid,
cis-10 18:1 fatty acid,
cis-11 18:1 fatty acid,
cis-12 18:1 fatty acid,
cis-13 18:1 fatty acid,
cis-14 18:1 fatty acid,
cis-15 18:1 fatty acid,
cis-16 18:1 fatty acid,
cis-5, trans-7 18:2 CLA,
trans-5, cis-7 18:2 CLA,
cis-6, trans-8 18:2 CLA,
trans-6, cis-8 18:2 CLA
cis-7, trans-9 18:2 CLA,
trans-7, cis-9 18:2 CLA
cis-8, trans-10 18:2 CLA,
trans-8, cis-10 18:2 CLA
cis-9, trans-11 18:2 CLA,
trans-9, cis-11 18:2 CLA,
cis-10, trans-12 18:2 CLA,
trans-10, cis-12 18:2 CLA
cis-11, trans-13 18:2 CLA,
trans-11, cis-13 18:2 CLA
cis-12, trans-14 18:2 CLA,
trans-12, cis-14 18:2 CLA cis-13, trans-15 18:2 CLA,
trans-13, cis-15 18:2 CLA
18:2 n-6 CLA,
18:3 n-3 CLnA,
18:3 n-6 CLnA,
16:1 fatty acids both cis and trans isomers
20:1 fatty acids both cis and trans isomers and
20:2, 20:3 and 20:4 conjugated fatty acids These fatty acids can be used as a feed additive that is part of combination with instructions to add an amount of these fatty acids sufficient to reduce the percentage of fat in the milk produced by said ruminant production animal. The feed composition is preferably high in carbohydrates and comprises a carbohydrate source, such as up to 75 wt. % corn when the acids are not in a protected form. These conjugated linoleic acids, conjugated linolenic acids and monoenoic fatty acids can be used in protected form, such as the salt form, an amide form or an ester form, to protect them from further biohydrogenation in the rumen. Alternatively, they can be used in an unprotected form preferably with a further feed supplement comprising oils rich in 18:2 n-6, 18:3 n-6 or fish oils.

Methods for reducing the percentage of milk fat in milk and for increasing the CLA content of milk produced by ruminant production animals are provided which simply comprise feeding ruminant production animals diets modified in fat as described above for a period of time sufficient to generate such an effect, typically 5 days or more. Amounts of 0.2 wt % and above, based on the total weight of dry matter, for the conjugated linoleic acids and conjugated linolenic acids and 0.5 wt % and above, based on the total weight of dry matter, for the monoenoic fatty acids arm preferred. Increases in the CLA content 3-fold and 10-fold within the milk and meat products from ruminant production animals can be obtained.

Examples Include
cis-5, trans-7 18:2 CLA,
trans-5, cis-7 18:2 CLA,
cis-6, trans-8 18:2 CLA,
trans-6, cis-8 18:2 CLA
cis-7, trans-9 18:2 CLA,
trans-7, cis-9 18:2 CLA
cis-8, trans-10 18:2 CLA,
trans-8, cis-10 18:2 CLA
cis-9, trans-11 18:2 CLA,
trans-9, cis-11 18:2 CLA
cis-10, trans-12 18:2 CLA,
trans-10, cis-12 18:2 CLA
cis-11, trans-13 18:2 CLA,
trans-11, cis-13 18:2 CLA
cis-12, trans-14 18:2 CLA,
trans-12, cis-14 18:2 CLA
cis-13, trans-15 18:2 CLA, Such methods can provide milk and meat products from a ruminant production animal with higher levels of CLA's. For example, milk with over 0.4 wt. % fat as cis 9, Trans 11 CLA derived from the ruminant production animal and be obtained.

Although the invention is described with preferred embodiments, it is to be understood that variations and modifications may be used as will be appreciated by those of ordinary skill in the art. For instance, the invention includes feeding fats which contain tFA in the form of triglycerides, partial glycerides, free acids or as fatty acid derivatives such as salts, amides, esters, etc. These fatty acids or the substrate for the production of these fatty acids can be fed to various animals to produce the desired levels of CLA in the animal. Likewise human diets could be supplemented with the naturally occurring substrates or edible products of animals consuming CLA producing diets.

REFERENCES

EXAMPLE 1

1 Association of Official Analytical Chemists. 1984. Official Methods of Analysis. 14th ed. AOAC, Washington, D.C.
2 Astrup, H. N., L. Vik-Mo, A. Ekem, and F. Bakke. 1976. Feeding protected and unprotected oils to dairy cows. J. Dairy Sci. 59:426.
3 Banks, W., I, L. Clapperton, M. E. Kelly, A. G. Wilson, and R. I. M. Crawford. 1980. The yield, fatty acid composition and physical properties of milk fat obtained by feeding soya oil to dairy cows. J. Sci. Food Agric. 31:368.
4 Bickerstaffe, R., D. E. Noakes, and E. F. Annison. 1972. Quantitative aspects of fatty acid biohydrogenation, absorption and transfer into milk fat in the lactating goat, with special reference to the cis- and trans-isomers of octadecenoate and linoleate. Bichem. J. 130:607.
5 Casper, D. P., Schingoethe, D. I., Middaugh, R. P., and R. I. Baer. 1988. Lactational responses of dairy cows to diets containing regular and high oleic acid sunflower seeds. J. Dairy Sci. 71:1267.
6 Chouinard, P. Y., V. Girard, and G. I. Brisson. 1995. Influence of calcium salts of fatty acids (CSFA) with varying unsaturation on yield, composition, and fatty acid profile in Holstein milk. Can J. Anim. Sci. 75:656.(Abstr.)
7 Doreau, M., and A. Ferlay. 1994. Digestion and utilization of fatty acids by ruminants. Anim. Feed Sci. Technol. 45:379.
8 Ferlay, A., I. Chabrot, Y. Elmeddah, and M. Doreau. 1993. Ruminal lipid balance and intestinal digestion by dairy cows fed calcium salts of rapeseed oil fatty acids or rapeseed oil. J. Anim Sci. 71:2237.
9 Gaynor, P. J., R. A Erdman, B. B. Teter, J. Sampugna, A. V. Capuco, D. R. Waldo, and M. Hamosh. 1994. Milk fat yield and composition during abomasal infusion of cis or trans octanodecenoates in holstein cows. J. Dairy Sci. 77:157.
10 Goering, H. K., and P. J. Van Soest. 1970. Forage Fiber Analyses (Apparatus, Reagents, Procedures, and Some Applications). Agric. Handbook No. 379. ARS-USDA, Washington, D.C.
11 Harfoot, C. G. 1978. Lipid metabolism in the rumen. Prog. Lipid Res. 17:21.
12 Harfoot, C. G., and G. P. Hazlewood. 1988. Lipid metabolism in the rumen. Page 285 in The Rumen Microbial Ecosystem. P. N. Hobson, ed Elsevier Appl. Sci., London, England.
13 Kalscheur, K. F., R A Erdman, B. B. Teter, and L. S. Piperova. 1997 Effect of dietary forage level and buffer addition on duodenal flow of trans-18:1 fatty acids and milk fat production in dairy cows. 80:(J. Dairy Sci. 80:2104–2114).
14 Katz, I., and M. Keeney. 1966. Characterization of the octadecenoic acids in rumen digesta and rumen bacteria (J. Dairy Sci. 49:962).
15 Klusmeyer, T. H., and I. H. Clark. 1991. Effects of dietary fat and protein on fatty acid flow to the duodenum and in milk produced by dairy cows. (J. Dairy Sci. 74:3055).
16 National Research Council. 1989. Nutrient Requirements of Dairy Cattle. 6th rev. ed Natl. Acad. Sci., Washington, D.C.

17 Noble, R. C. 1978. Digestion, absorption, and transport of lipids in ruminant animals. Prog. Lipid Res. 17:55.

18 Romo, G. A. 1995. Trans fatty acids: rumen in vitro production and their subsequent metabolic effects on energy metabolism and endocrine responses in the lactating dairy cow. Ph.D. Diss., Univ. Maryland, College Park.

19 Sampugna, I., L. A. Pallansch, M. G. Enig, and M. Keeney. 1982. Rapid analysis of trans fatty acids on SP-2340 glass capillary columns. J. Chromotgr. 129:245.

20 SAS@ Technical Report P-229. SAS/STAT@ Software: Changes and Enhancements, Release 6.07. 1992. SAS Inst., Inc., Cary, N.C.

21 SAS@ User's Guide: Statistics, Version 6.04 Edition. 1989. SAS inst., Inc., Cary, N.C.

22 Seiner, D. R., and L. H. Schultz. 1980. Effects of feeding oleic acid or hydrogenated vegetable oils to lactating cows (J. Dairy Sci. 63:1235).

23 Suzuke, E. Y., and R. I. Early. 1991. Analysis of chromic oxide in small samples of feed and feces using chlorine bleach. Can. I. Anim. Sci. 66:157.

24 Ushida, K. B., B. Lassalas, and I. P. Iounay. 1985. Determination of assay parameters for RNA analysis in bacterial and duodenal samples by spectrophotometry. Influence of sample treatment and preservation. Reprod. Nutr. Dev. 25: 1037.

25 Van Soest, P. I., I. B. Robertson, and B. A Lewis. 1991. Methods for dietary fiber, neutral detergent fiber, and nonstarch polysaccharides in relation to animal nutrition. (I. Dairy Sci. 74:3583).

26 Weisbjerg, M. R, C. F. Bersting, and T. Hvelplund. 1992. Fatty acid metabolism in the digestive tract of lactating cows fed tallow in increasing amounts at two feed levels. Acta Agric. Scand. Sect. A 42: 106.

27 Wonsil, B. I., I. H. Herbein, and B. A. Watkins. 1994. Dietary and ruminally derived trans-18:1 fatty acids alter bovine milk lipids. J. Nutr. 124:556.

28 Wu, Z, O. A. Ohajuruka, and D. L. Palmquist. 1991. Ruminal synthesis, biohydrogenation, and digestibility of fatty acids by dairy cows. J. Dairy Sci. 4:3025.

29 Zinn, R A, and F. N. Owens. 1986. A rapid procedure for purine measurement and its use for estimating net ruminal protein synthesis. Can. J. Anim. Aci. 66:157.

REFERENCES

EXAMPLE 2

1 Askew, E. W., R S. Emery, and I. W. Thomas. 1971. Fatty acid specificity of glyceride synthesis by homogenates of bovine mammary tissue. Lipids 6:777.

2 Association of Official Analytical Chemists. 1984. Official Methods of Analysis. 14th ed. AOAC, Washington, D.C.

3 Davis, C. L., and R E. Brown. 1970. Low-fat milk syndrome. Page 545 in Physiology of Digestion and Metabolism in the Ruminant. A T. Phillipson, ed. Oriel Press, Newcastle Upon Tyne, England.

4 Doreau, M., and A Ferlay. 1994. Digestion and utilization of fatty acids by ruminants. Anim. Feed Sci. Technol. 45:379.

5 Emery, R S., and L. D. Brown. 1961. Effect of feeding sodium and potassium bicarbonate and potassium bicarbonate on milk fat, rumen pH, and volatile fatty acid production. J. Dairy Sci. 71:3246.

6 Erdman, R A 1988. Dietary Buffering requirements of the lactating dairy cow. J. Dairy Sci. 71:3246.

7 Erdman, R. A., R. W. Hemken, and L. S. Bull. 1982. Dietary sodium bicarbonate and magnesium oxide for early postpartum lactating dairy cows: effects on production, acid-base metabolism, and digestion. I. Dairy Sci. 65:712.

8 Gaynor, P. I., R. A. Erdman, B. B. Teter, I. Sampugna, A. V. Capuco, D. R. Waldo, and M. Hamosh. 1994. Milk fat yield and composition during abosomal infusion of cis or trans octanodecenoates in Holstein cows. I. Dairy Sci. 77:157.

9 Gaynor, P. I., D. R. Waldo, A. V. Capuco, R. A. Erdman, L. W. Douglass, and B. B. Teter. 1995. Milk fat depression, the glucogenic theory, and trans-C18:1 fatty acids. I. Dairy Sci. 78:2008.

10 Goering, H. K., and P. I. Van Soest. 1970. Forage Fiber Analyses (Appartus, Reagents, Procedures, and Some Applications). Agric. Handbook No. 379. ARS-USDA, Washington, D.C.

11 Grant, R. I., and D. R. Mertens. 1992. Influence of buffer pH and raw corn starch addition on in vitro fiber digestion kinetics. I. Dairy Sci. 75:2762.

12 Harfoot, C. G. 1978. Lipid metabolism in the rumen. Prog. Lipid Res. 17:21.

13 Harfoot, C. G., and G. P. Hazlewood. 1988. Lipid metabolism in the rumen. Page 285 in The Rumen Microbial Ecosystem. P. N. Hobson, ed. Elsevier Appl. Sci., London, England.

14 Harrison, D. G., and A. B. McAllan. 1980. Factors affecting microbial growth yields in the reticulo-rumen. Page 205 in Digestive Physiology and Metabolism in Ruminants. Y. Ruckebusch and P. Thivend, ed. A VI Publ. Co., Inc., Westport, Conn.

15 Klusmeyer, T. H., G. L. Lynch, J. H. Clark, and D. R. Nelson. 1991. Effects of calcium salts of fatty acids and proportion of forage in diet on ruminal fermentation and nutrient flow to duodenum of cows. Dairy Sci. 74:2220.

16 National Research Council. 1989. Nutrient Requirements of Dairy Cattle. 6th rev. ed. Natl. Acad. Sci., Washington, D.C.

17 Noble, R. C. 1978. Digestion, absorption, and transport of lipids in ruminant animals. Prog. Lipid Res. 17:55.

18 Rode, L. M., D. C. Weakly, and L. D. Satter. 1985. Effect of forage amount and particle size in diets of lactating dairy cows on site of digestion and microbial protein synthesis. Can. Anim. Sci. 68:445.

19 Rogers, J. A., C. L. Davis, and J. H. Clark. 1982. Alteration of rumen fermentation, milk far synthesis and nutrient utilization with minerals salts in dairy cows. i. Dairy Sci. 65:577.

20 Romo, G. A. 1995. Trans fatty acids: rumen in vitro production and their subsequent metabolic effects on energy metabolism and endocrine responses in the lactating dairy cow. Ph.D. Diss, Univ. Maryland, College Park.

21 SAS@ Technical Report P-229. SAS/STAT@ Software: Changes and Enhancements, Release 6.07. 1992. SAS Inst., Inc., Cary, N.C.

22 SAS@ User's Guide: Statistics, Version 6.04 Edition. 1989. SAS Inst., Cary, N.C.

23 Selner, D. R., and L. H. Schultz. 1980. Effects of feeding oleic acid or hydrogenated vegetable oils to lactating cows. J. Dairy Sci. 63:1235.

Toussant, M. J., Wilson, M. D. & Clarke, S. D. (1981) Coordinate suppression of liver acetyl-CoA carboxylase and fatty acid synthetase by polyunsaturated fat. J. Nutr. 111:146–153.

Van Nevel, C. J. & Demeyer, D. I. (1996) Influence of pH on lipolysis and biohydrogenation of soybean oil by rumen content in vitro. Reprod. Nutr. Dev. 36:53–63.

Wakil, S. J., Stoops, J. K., & Joshi, V. C . (1983) Fatty acid synthesis and its regulation. Ann. Rev. Biochem. 52:537–579.

Wong, M. K. & Sampugna, J. (1993) Moisture, total lipid, fatty acids and cholesterol in raw ground turkey. J. Agric.

Food Chem. 41:1229–1231. Wonsil, B. J., Herbein, J. H. & Watkins, B. A. (1994) Dietary and ruminally derived trans-18:1 fatty acids alter bovine milk lipids. J. Nutr. 124:556–565.

Yurawecz, M. P., Roach, J. A. G., Sehat, N., Mossoba, M. M., Kramer, J. K. G., Fritsche, J., Steinhart, H. & Ku, Y. (1998) A new conjugated linoleic acid isomer, 7 trans, 9 cis-octadecadienoic acid, in cow milk, cheese, beef and human milk and adipose tissue. Lipids, 33:803–809.

What is claimed is:

1. A method for reducing the percentage of milk fat in milk produced from cows which comprises preparing a fat modified feed for said cows by adding monoenoic acids, conjugated linolenic acids or conjugated linoleic acids as an additive to a feed and feeding the fat modified feed to lactating cows for three weeks or more, wherein the total amount of monoenoic acids, conjugated linoleic acids or conjugated linolenic acids added to the feed is 0.02 wt. % or more, based on total weight of dry matter in the feed wherein the monoenoic acid, conjugated linoleic acids, conjugated linolenic acids are in a protected form or unprotected form.

2. A method for reducing the percentage of milk fat in milk produced from cows which comprises preparing a fat modified feed for said cows by adding trans isomers of conjugated linoleic acids or conjugated linolenic acids as an additive to a feed high in carbohydrates and feeding the fat modified feed to lactating cows for three weeks or more, wherein the total amount of trans isomers of conjugated linoleic acids or conjugated linolenic acids added to the feed is 0.02 wt. % or more, based on total weight of dry matter in the feed.

3. A method as in claim 1 wherein the monoenoic acids, conjugated linoleic acids or conjugated linolenic acids are a predominant component of said additive.

4. A method as in claim 2 wherein the trans isomers of the conjugated linoleic acids or conjugated linolenic acids are a predominant component of said additive.

5. A method as in claim 1 wherein the fat modified feed comprises ground corn in amounts up to about 75% by weight and the conjugated linoleic acids or conjugated linolenic acids are selected from the group consisting of 18:2 n-6 CLA, 18:3 n-3 CLA and 18:3 n-6 CLA.

6. A method as in claim 1 wherein the monoenoic acids, conjugated linoleic acids or conjugated linolenic acids are not protected and the feed is supplemented with oils rich in 18:2 n-6, 18:3 n-3 or fish oils.

7. A method as in claim 1 wherein the conjugated linoleic acids or conjugated linolenic acids are cis, cis isomers; cis, trans isomers; trans, cis isomers or trans, trans isomers.

8. A method as in claim 1 wherein the milk fat within the milk is reduced by more than 25%.

9. A method for reducing the percentage of milk fat in milk produced from cows which comprises preparing a fat modified feed for said cows by adding a trans isomer of a 18:1 fatty acid as an additive to a feed high in carbohydrates and feeding the fat modified feed to lactating cows for three weeks or more, wherein the trans isomer of a 18:1 fatty acid is added to the feed at a level of 0.5 wt. % or more, based on total weight of dry matter in the feed.

10. A method as in claim 9 wherein the trans isomer of a 18:1 fatty acid is the predominant component of said additive.

11. A method as in claim 9 wherein the fat modified feed comprises ground corn in amounts up to about 75% by weight and the fatty acid is trans-11 18:1 fatty acid.

12. A method for reducing the percentage of milk fat in milk produced from cows which comprises preparing a fat modified feed for said cows by adding a fatty acid selected from the group consisting of trans-5 18:1 fatty acid,
trans-6 18:1 fatty acid,
trans-7 18:1 fatty acid,
trans-8 18:1 fatty acid,
trans-9 18:1 fatty acid,
trans-10 18:1 fatty acid,
trans-11 18:1 fatty acid,
trans-12 18:1 fatty acid,
trans-13 18:1 fatty acid,
trans-14 18:1 fatty acid,
trans-15 18:1 fatty acid,
trans-16 18:1 fatty acid,
cis-5 18:1 fatty acid,
cis-6 18:1 fatty acid,
cis-7 18:1 fatty acid,
cis-8 18:1 fatty acid,
cis-9 18:1 fatty acid,
cis-10 18:1 fatty acid,
cis-11 18:1 fatty acid,
cis-12 18:1 fatty acid,
cis-13 18:1 fatty acid,
cis-14 18:1 fatty acid,
cis-15 18:1 fatty acid,
cis-16 18:1 fatty acid,
cis-5, trans-7 18:2 CLA,
trans-5, cis-7 18:2 CLA,
cis-6, trans-8 18:2 CLA,
trans-6, cis-8 18:2 CLA
cis-7, trans-9 18:2 CLA,
trans-7, cis-9 18:2 CLA
cis-8, trans-10 18:2 CLA,
trans-8, cis-10 18:2 CLA
cis-9, trans-11 18:2 CLA,
trans-9, cis-11 18:2 CLA
cis-10, trans-12 18:2 CLA,
trans-10, cis-12 18:2 CLA
cis-11, trans-13 18:2 CLA,
trans-11, cis-13 18:2 CLA
cis-12, trans-14 18:2 CLA,
trans-12, cis-14 18:2 CLA
cis-13, trans-15 18:2 CLA,
trans-13, cis-15 18:2 CLA
18:2 CLA isomers,
18:2 n-6 CLA,
18:3 n-3 CLnA,
18:3 n-6 CLnA,
16:1 fatty acids both cis and trans isomers
20:1 fatty acids both cis and trans isomers
18:3 conjugated fatty acids
20:2, 20:3 and 20:4 conjugated fatty acids and salt forms thereof as an additive to a feed high in carbohydrates and feeding the fat modified feed to lactating cows for three weeks or more, wherein the fatty acid is added to the feed at a level of 0.2 wt. % or more, based on total weight of dry matter in the feed.

13. A method as in claim 12 wherein the fatty acid is the predominant component of said additive.

14. A method as in claim 12 wherein the fatty acid is in a protected form.

15. A method as in claim 12 wherein the fatty acid is in a salt form.

16. A method as in claim 12 wherein the milk fat within the milk is reduced by more than 25%.

17. A method as in claim 12 wherein the fatty acids are not protected and the feed is supplemented with oils rich in 18:2 n-6, 18:3 n-3 or fish oils.

18. A method for reducing the percentage of milk fat in milk produced from cows which comprises preparing a fat modified feed for said cows by adding a fatty acid selected from the group consisting of trans-5 18:1 fatty acid,
trans-6 18:1 fatty acid,
trans-7 18:1 fatty acid,
trans-8 18:1 fatty acid,
trans-9 18:1 fatty acid,
trans-10 18:1 fatty acid,
trans-11 18:1 fatty acid,
trans-12 18:1 fatty acid,
trans-13 18:1 fatty acid,
trans-14 18:1 fatty acid,
trans-15 18:1 fatty acid,
trans-16 18:1 fatty acid,
cis-5 18:1 fatty acid,
cis-6 18:1 fatty acid,
cis-7 18:1 fatty acid,
cis-8 18:1 fatty acid,
cis-9 18:1 fatty acid
cis-10 18:1 fatty acid,
cis-11 18:1 fatty acid,
cis-12 18:1 fatty acid,
cis-13 18:1 fatty acid,
cis-14 18:1 fatty acid,
cis-15 18:1 fatty acid,
cis-16 18:1 fatty acid,
cis-5, trans-7 18:2 CLA,
trans-5, cis-7 18:2 CLA,
cis-6, trans-8 18:2 CLA,
trans-6, cis-8 18:2 CLA
cis-7, trans-9 18:2 CLA,
trans-7, cis-9 18:2 CLA
cis-8, trans-10 18:2 CLA,
trans-8, cis-10 18:2 CLA
cis-9, trans-11 18:2 CLA,
trans-9, cis-11 18:2 CLA
cis-10, trans-12 18:2 CLA,
trans-10, cis-12 18:2 CLA
cis-11, trans-13 18:2 CLA,
trans-11, cis-13 18:2 CLA
cis-12, trans-14 18:2 CLA,
trans-12, cis-14 18:2 CLA
cis-13, trans-15 18:2 CLA,
trans-13, cis-15 18:2 CLA
18:2 CLA isomers,
18:2 n-6 CLA,
18:3 n-3 CLnA,
18:3 n-6 CLnA,
16:1 fatty acids both cis and trans isomers
20:1 fatty acids both cis and trans isomers
18:3 conjugated fatty acids
20:2, 20:3 and 20:4 conjugated fatty acids in a protected form as an additive to a feed and feeding the fat modified feed to lactating cows for three weeks or more, wherein the fatty acid is added to the feed at a level of 0.2 wt. % or more, based on total weight of dry matter in the feed.

* * * * *